(12) United States Patent
Nakane

(10) Patent No.: US 11,683,439 B2
(45) Date of Patent: Jun. 20, 2023

(54) IMAGE FORMING APPARATUS CAPABLE OF ACHIEVING BOTH CONVENIENCE OF USER AND DEFENSE AGAINST EXTERNAL THREATS, CONTROL METHOD FOR IMAGE FORMING APPARATUS, AND STORAGE MEDIUM

(71) Applicant: CANON KABUSHIKI KAISHA, Tokyo (JP)

(72) Inventor: Hiroyuki Nakane, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/846,204

(22) Filed: Jun. 22, 2022

(65) Prior Publication Data
US 2022/0417388 A1    Dec. 29, 2022

(30) Foreign Application Priority Data

Jun. 25, 2021    (JP) .............................. JP2021-105933

(51) Int. Cl.
*H04N 1/32*    (2006.01)
*H04N 1/44*    (2006.01)
(Continued)

(52) U.S. Cl.
CPC ....... *H04N 1/4433* (2013.01); *H04N 1/32358* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,384,434 B2 | 7/2016 | Adachi | |
| 2004/0249956 A1* | 12/2004 | Tanimoto | ............... H04W 84/20 709/227 |
| 2016/0050331 A1* | 2/2016 | Maki | .................. H04N 1/00854 358/1.9 |

FOREIGN PATENT DOCUMENTS

| | | | | |
|---|---|---|---|---|
| JP | 2001334731 | * | 12/2001 | ............... H04N 1/00 |
| JP | 2007328558 | * | 12/2007 | ............... G06F 3/12 |

(Continued)

OTHER PUBLICATIONS

J. Müller, V. Mladenov, J. Somorovsky and J. Schwenk, "SoK: Exploiting Network Printers," 2017 IEEE Symposium on Security and Privacy (SP), San Jose, CA, USA, 2017, pp. 213-230, doi: 10.1109/SP.2017.47. (Year: 2017).*

*Primary Examiner* — Beniyam Menberu
(74) *Attorney, Agent, or Firm* — Rossi, Kimms & McDowell LLP

(57) ABSTRACT

An image forming apparatus capable of achieving both convenience of a user and defense against external threats is provided. The image forming apparatus that transmits and receives data to and from a plurality of external apparatuses via a plurality of network ports includes a setting unit configured to set an application permitted to be used in a mode, which blocks the network ports other than a prescribed network port in response to a request from the outside, a job storing unit configured such that in a case that a job received from the external apparatus via one of the plurality of network ports is not a job of the application permitted to be used which is set by the setting unit, the received job is stored, an authentication unit configured to perform user authentication, and a print permitting unit configured such that in a case that the user authentication is performed by the authentication unit with respect to a user (Continued)

who generated the stored job, printing of the stored job by the authenticated user is permitted.

9 Claims, 22 Drawing Sheets

(51) Int. Cl.
*G06F 3/12* (2006.01)
*G06K 15/02* (2006.01)

(56) References Cited

FOREIGN PATENT DOCUMENTS

| JP | 2012187866 | * 10/2012 | ............... G06F 3/12 |
| JP | 2015003407 A | 1/2015 | |
| JP | 2018196990 | * 12/2018 | ............... H04N 1/00 |

* cited by examiner

FIG. 10

| LEVEL | AVAILABLE PRINT APPLICATION | SUPPORTED NETWORK PORT |
|---|---|---|
| 1 | IPP PRINT APPLICATION 1 | HTTPS, IPP |
| 1 | IPPS PRINT APPLICATION 1 | HTTPS, IPPS |
| 1 | CLOUD PRINT APPLICATION 1 | HTTPS |
| 1 | ... | |
| 2 | FORCIBLE HOLD PRINT | HTTPS, RAW |
| 2 | ON-PREMISES PRINT APPLICATION 1 | HTTPS, RAW |
| 2 | ... | |
| 3 | DIRECT PRINT | HTTP, LPD |
| 3 | PDL DRIVER PRINT | RAW |
| 3 | ... | |
| 4 | USBD PRINT | --- |
| 4 | USB MEDIA PRINT | --- |
| 4 | ... | |

IMAGE FORMING APPARATUS CAPABLE OF ACHIEVING BOTH CONVENIENCE OF USER AND DEFENSE AGAINST EXTERNAL THREATS, CONTROL METHOD FOR IMAGE FORMING APPARATUS, AND STORAGE MEDIUM

BACKGROUND OF THE INVENTION

Field of the Invention

The present invention relates to an image forming apparatus tailored to a user environment while removing unexpected external threats in a system configuration that does not presuppose defense by a firewall against network access from a storage apparatus, a control method for the image forming apparatus, and a storage medium.

Description of the Related Art

Conventional office security presupposes that although there is an attack from outside a company, it is possible to trust inside the company. The conventional office security has used a boundary type defense model that defends by a boundary called a firewall against the outside.

However, in the future, it is expected that the premise changes to the assumption that humans and devices are dispersed, there will be attacks from anywhere, and there will be leaks from the inside the company and from employees. For this reason, it is required even in an image forming apparatus such as a multifunction peripheral to support a zero trust type defense model, which does not trust (i.e., never trust) all places and people and requires defense against each place and each person.

Japanese Laid-Open Patent Publication (kokai) No. 2015-3407 discloses a technique, in which a security policy is set in advance, verifying whether or not a job received by an image forming apparatus matches the security policy is performed, and in the case that the job received by the image forming apparatus does not match the security policy, the execution of the job is restricted.

In addition, there is also a conventional technique for providing a function of forcibly blocking communications with the outside that may be exposed to threats without a firewall (hereinafter, referred to as "a ZT (zero trust) mode"). In the ZT mode, the functionality of the image forming apparatus that a device user (hereinafter, simply referred to as "a user") wants to use is ensured by permitting communications only for paths of applications set by a system administrator.

However, in the technique disclosed in Japanese Laid-Open Patent Publication (kokai) No. 2015-3407, in order to judge whether or not the job received by the image forming apparatus matches the security policy, it is necessary to import data transmitted from the outside including non-secure paths into the image forming apparatus and then verify it.

On the other hand, when the ZT mode is executed, the user has to confirm the application set by the system administrator and then submit the job. That is, in the case that a job is submitted by an application other than the applications set by the system administrator even if the user does not intend to attack, there is a problem in terms of the convenience of the user that the job will not be accepted by the image forming apparatus or will result in an error.

SUMMARY OF THE INVENTION

The present invention provides an image forming apparatus capable of achieving both convenience of a user and defense against external threats, a control method for the image forming apparatus, and a storage medium.

Accordingly, the present invention provides an image forming apparatus that transmits and receives data to and from a plurality of external apparatuses via a plurality of network ports, comprising a setting unit configured to set an application permitted to be used in a mode, which blocks the network ports other than a prescribed network port in response to a request from the outside, a job storing unit configured such that in a case that a job received from the external apparatus via one of the plurality of network ports is not a job of the application permitted to be used which is set by the setting unit, the received job is stored, an authentication unit configured to perform user authentication, and a print permitting unit configured such that in a case that the user authentication is performed by the authentication unit with respect to a user who generated the stored job, printing of the stored job by the authenticated user is permitted.

According to the present invention, it is possible to achieve both the convenience of the user and the defense against the external threats.

Further features of the present invention will become apparent from the following description of exemplary embodiments with reference to the attached drawings.

BRIEF DESCRIPTION OF THE DRAWINGS

FIG. 10 is a table that shows a list of print applications, which are available in the multifunction peripheral, and supported network ports.

DESCRIPTION OF THE EMBODIMENTS

The present invention will now be described in detail below with reference to the accompanying drawings showing embodiments thereof.

Hereinafter, preferred embodiments of an image forming apparatus for carrying out the present invention will be described with reference to the drawings. Here, the image forming apparatus according to each of the preferred embodiments is a digital multifunction peripheral (MFP, hereinafter simply referred to as "a multifunction peripheral 1000") that has a network cooperation function. However, the image forming apparatus for carrying out the present invention is not limited to the multifunction peripheral 1000, and may be, for example, an SFP (Single Function Peripheral) as long as it has the network cooperation function.

Figure 1:
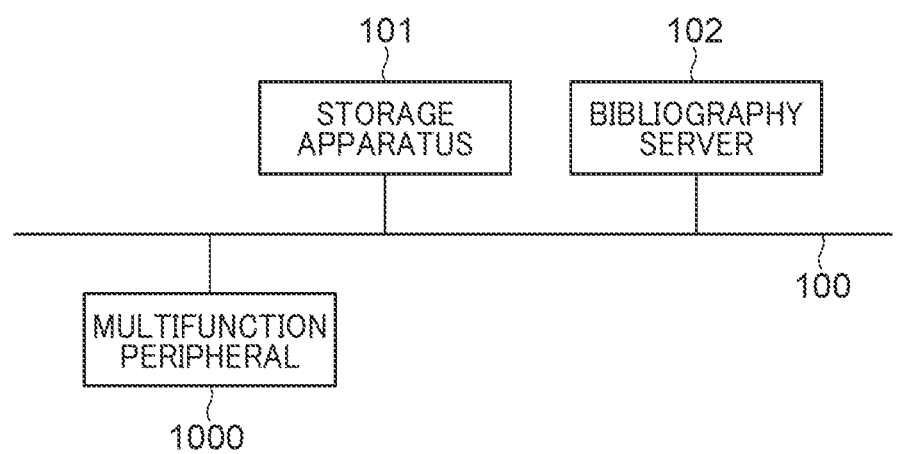
FIG. 1 is a configuration diagram of a system that includes a multifunction peripheral as an image forming apparatus according to a first embodiment of the present invention.

First, a first embodiment of the present invention will be described. FIG. 1 is a configuration diagram of a system that includes the multifunction peripheral 100 as an image forming apparatus according to the first embodiment of the present invention.

The multifunction peripheral 1000 can transmit and receive print data, scanned image data, device management information, etc. to and from a storage apparatus 101 and a bibliography server 102 via a network 100.

Moreover, although FIG. 1 exemplifies a configuration in which one multifunction peripheral 1000, one storage apparatus 101, and one bibliography server 102 are connected to the network 100, such a configuration in which a plurality of multifunction peripherals 1000, a plurality of storage apparatuses 101, and a plurality of bibliography servers 102 are connected to the network 100 may be adopted.

Figure 2A:
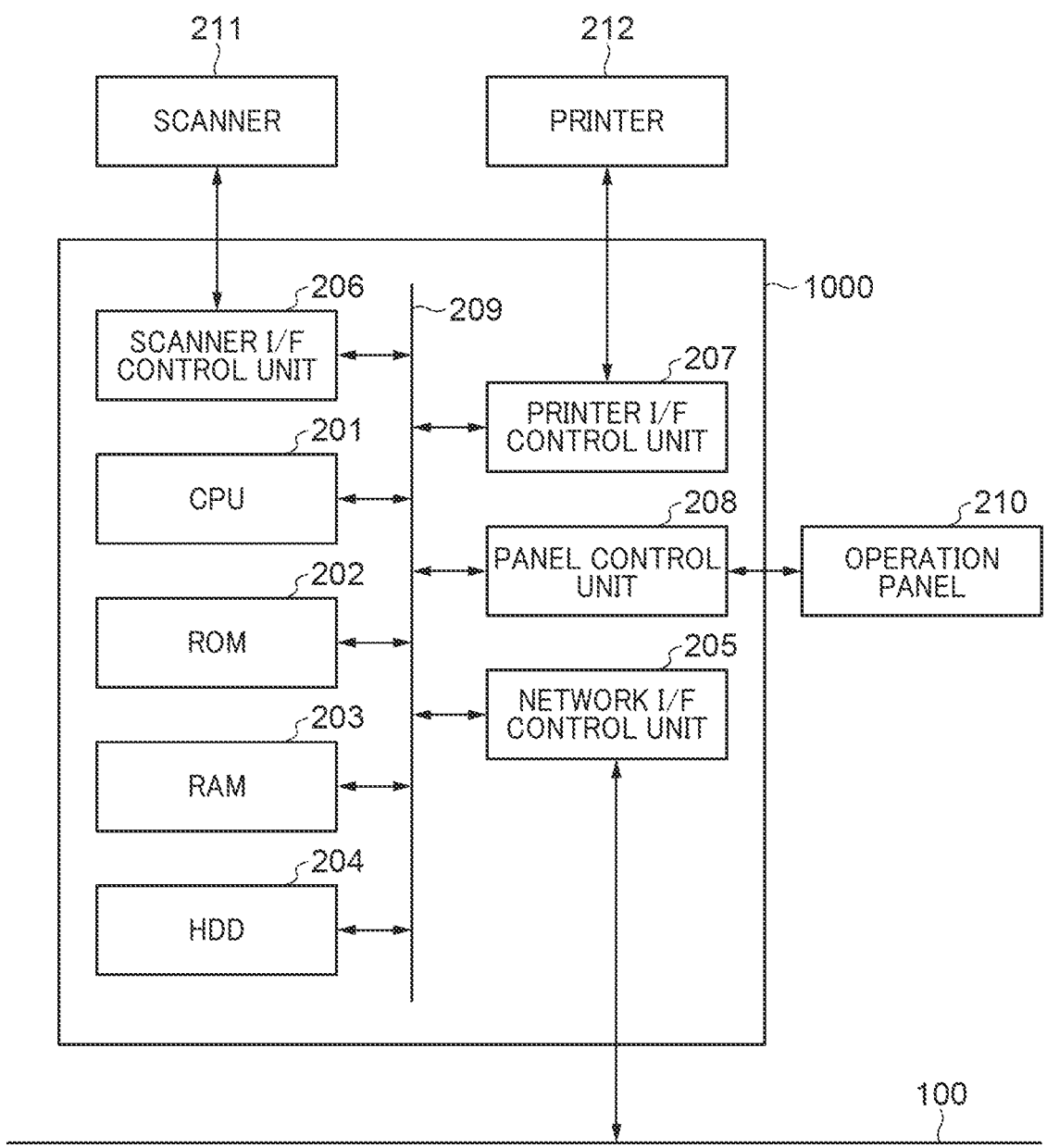
FIG. 2A is a block diagram that shows a hardware configuration of the multifunction peripheral of FIG. 1.

FIG. 2A is a block diagram that shows a hardware configuration of the multifunction peripheral 1000.

As shown in FIG. 2A, the multifunction peripheral 1000 includes a CPU (Central Processing Unit) 201, a ROM (Read Only Memory) 202, a RAM (Random Access Memory) 203, an HDD (Hard Disk Drive) 204, a network I/F (interface) control unit 205, a scanner I/F control unit 206, a printer OF control unit 207, a panel control unit 208, and a bus 209.

The CPU 201 executes software programs of the multifunction peripheral 1000 and performs control of the entire multifunction peripheral 1000.

The ROM 202 stores a boot program, fixed parameters, etc. of the multifunction peripheral 1000.

The RAM 203 is used for storing the programs and temporary data when the CPU 201 controls the multifunction peripheral 1000.

The HDD 204 stores system software, applications, and various kinds of data.

The CPU 201 controls operations of the multifunction peripheral 1000 by executing the boot program stored in the ROM 202, expanding programs stored in the HDD 204 to the RAM 203, and executing the expanded programs.

The network I/F control unit 205 controls transmission and reception of data to and from the storage apparatus 101 and the bibliography server 102, which are external apparatuses connected to the network 100.

The scanner I/F control unit 206 controls reading of a document performed by a scanner 211.

The printer I/F control unit 207 controls a printing processing, etc. that are performed by a printer 212.

The panel control unit 208 controls a touch panel type operation panel 210, and controls displaying of various kinds of information and inputting of instructions from a user.

The bus 209 connects the CPU 201, the ROM 202, the RAM 203, the HDD 204, the network I/F control unit 205, the scanner I/F control unit 206, the printer I/F control unit 207, and the panel control unit 208 to each other. Control signals from the CPU 201 and data signals between devices (between components of the multifunction peripheral 1000 except the CPU 201) are transmitted and received via the bus 209.

Figure 2B:
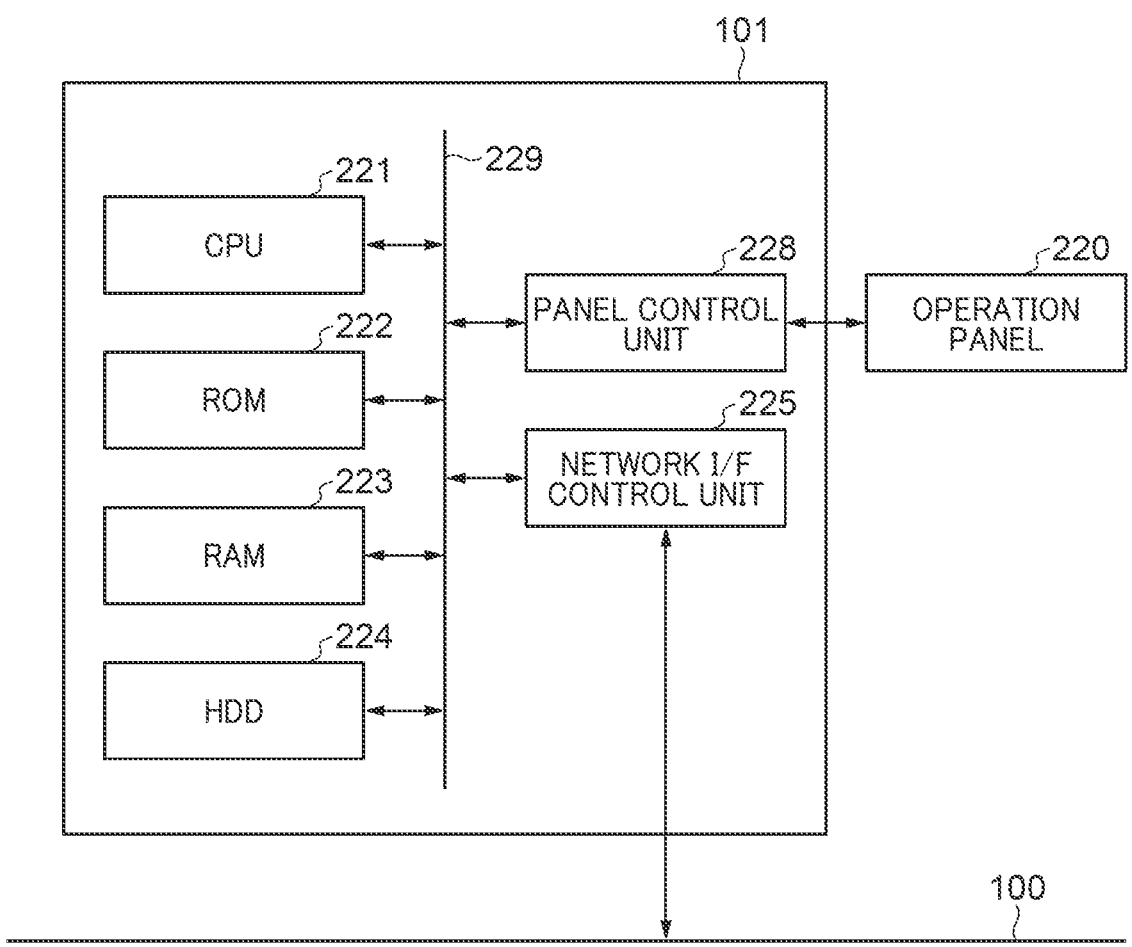
FIG. 2B is a block diagram that shows a hardware configuration of a storage apparatus of FIG. 1.

FIG. 2B is a block diagram that shows a hardware configuration of the storage apparatus 101.

As shown in FIG. 2B, the storage apparatus 101 includes a CPU 221, a ROM 222, a RAM 223, an HDD 224, a panel control unit 228, a network I/F control unit 225, and a bus 229.

The CPU 221 executes software programs of the storage apparatus 101 and performs control of the entire the storage apparatus 101.

The ROM 222 stores a boot program, fixed parameters, etc. of the storage apparatus 101.

The RAM 223 is used for storing the programs and temporary data when the CPU 221 controls the storage apparatus 101.

The HDD 224 stores system software, applications, and various kinds of data.

The CPU 221 controls operations of the storage apparatus 101 by executing the boot program stored in the ROM 222, expanding programs stored in the HDD 224 to the RAM 223, and executing the expanded programs.

The network I/F control unit 225 controls transmission and reception of data to and from the network 100.

The panel control unit 228 controls a touch panel type operation panel 220, and controls displaying of various kinds of information and inputting of instructions from the user. Moreover, in the first embodiment of the present invention, although an example in which the panel control unit 228 controls an input from the operation panel 220 as an input to the storage apparatus 101 will be described, the present invention is not limited to this example. For example, such a configuration, which includes a display unit that only displays an output from the panel control unit 228 by using an I/O (Input/Output) device such as a keyboard or a mouse as an input, may be adopted.

The bus 229 connects the CPU 221, the ROM 222, the RAM 223, the HDD 224, the network I/F control unit 225, and the panel control unit 228 to each other. Control signals from the CPU 221 and data signals between devices (between components of the storage apparatus 101 except the CPU 221) are transmitted and received via the bus 229.

Figure 2C:
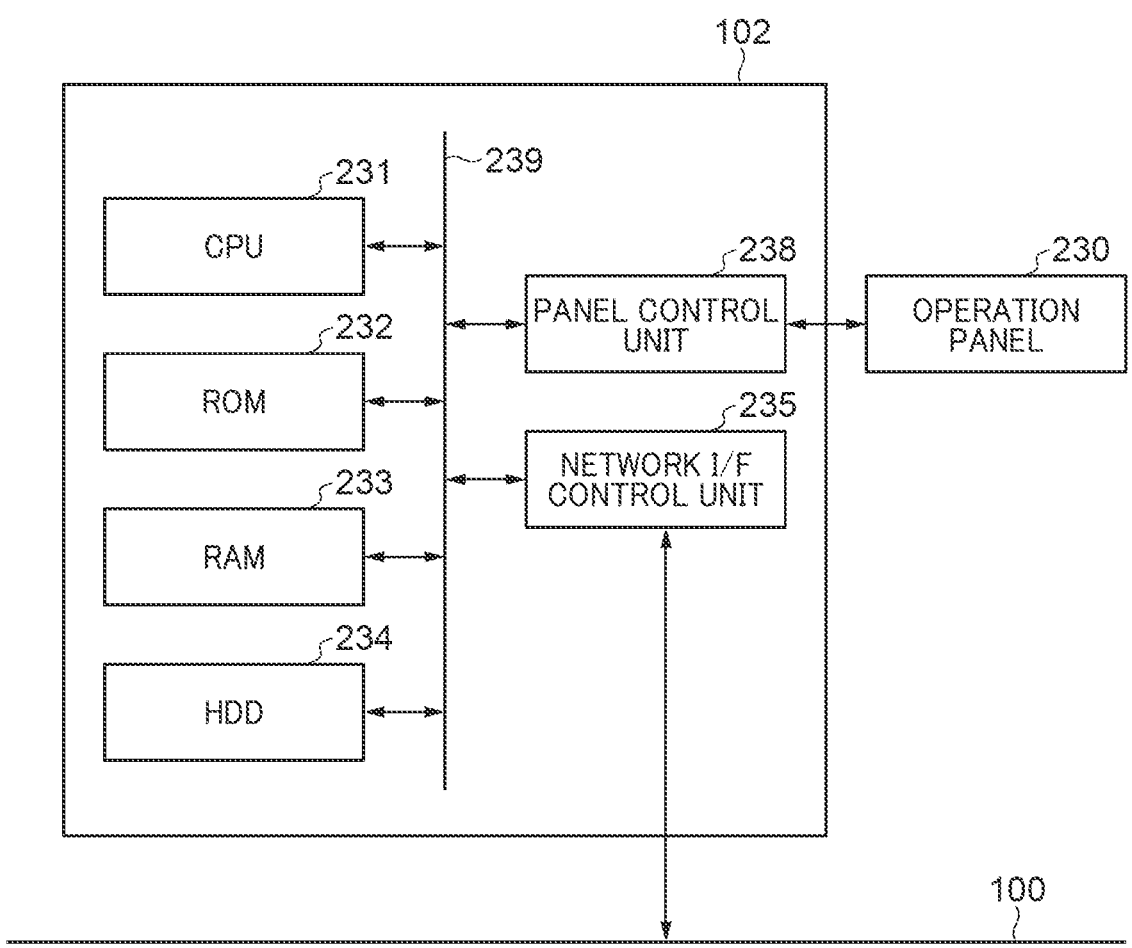
FIG. 2C is a block diagram that shows a hardware configuration of a bibliography server of FIG. 1.

FIG. 2C is a block diagram that shows a hardware configuration of the bibliography server 102.

As shown in FIG. 2C, the bibliography server 102 includes a CPU 231, a ROM 232, a RAM 233, an HDD 234, a panel control unit 238, a network I/F control unit 235, and a bus 239.

The CPU 231 executes software programs of the bibliography server 102 and performs control of the entire the bibliography server 102.

The ROM 232 stores a boot program, fixed parameters, etc. of the bibliography server 102.

The RAM 233 is used for storing the programs and temporary data when the CPU 231 controls the bibliography server 102.

The HDD 234 stores system software, applications, and various kinds of data.

The CPU 231 controls operations of the bibliography server 102 by executing the boot program stored in the ROM 232, expanding programs stored in the HDD 234 to the RAM 233, and executing the expanded programs.

The network I/F control unit 235 controls transmission and reception of data to and from the network 100.

The panel control unit 238 controls a touch panel type operation panel 230, and controls displaying of various kinds of information and inputting of instructions from the user. Moreover, in the first embodiment of the present invention, although an example in which the panel control unit 238 controls an input from the operation panel 230 as an input to the bibliography server 102 will be described, the present invention is not limited to this example. For example, such a configuration, which includes a display unit that only displays an output from the panel control unit 238 by using an I/O device such as a keyboard or a mouse as an input, may be adopted.

The bus 239 connects the CPU 231, the ROM 232, the RAM 233, the HDD 234, the network I/F control unit 235, and the panel control unit 238 to each other. Control signals from the CPU 231 and data signals between devices (between components of the bibliography server 102 except the CPU 231) are transmitted and received via the bus 239.

Figure 3A:
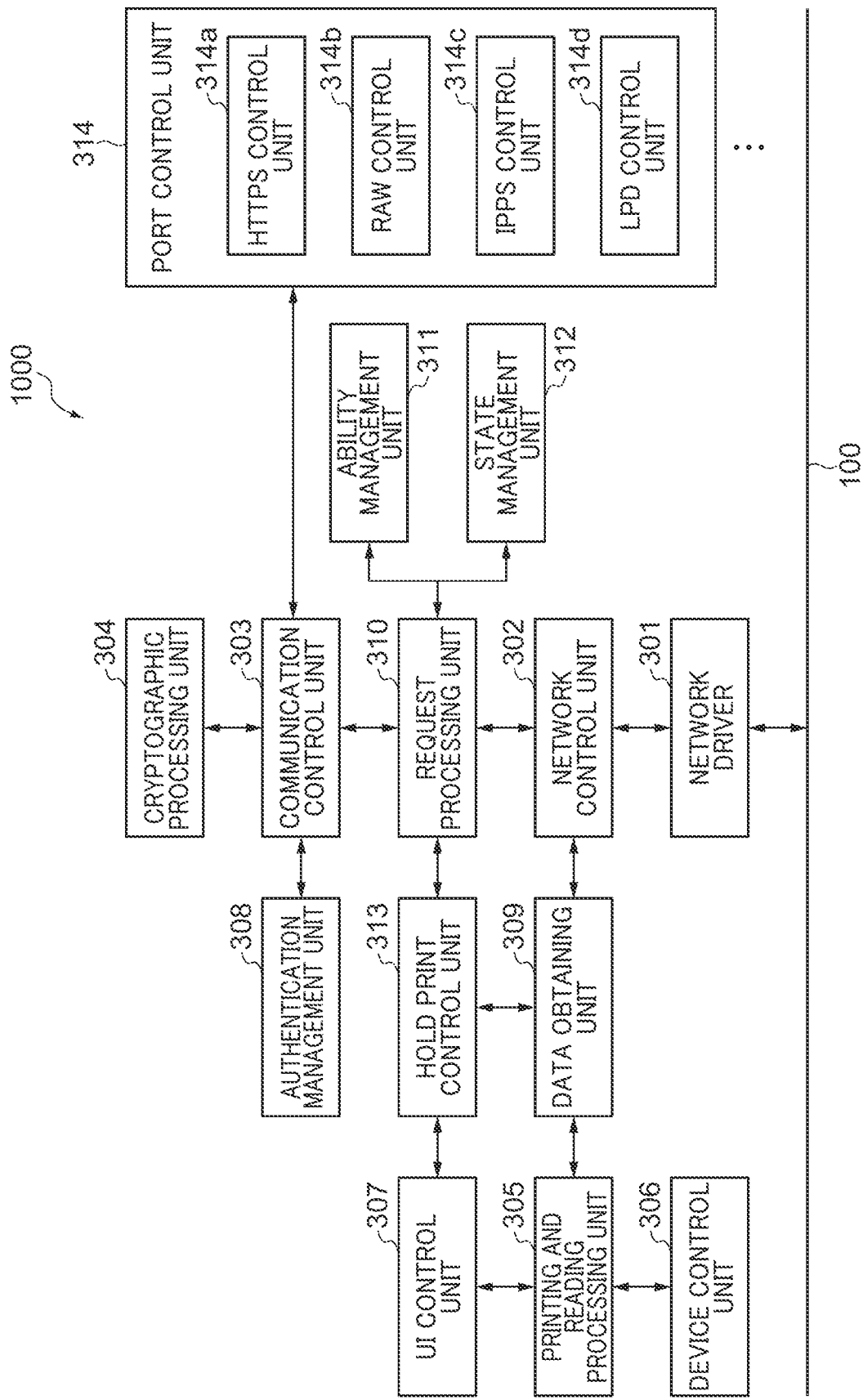
FIG. 3A is a block diagram that shows a software configuration of the multifunction peripheral of FIG. 1.

FIG. 3A is a block diagram that shows a software configuration of the multifunction peripheral 1000. Moreover, software modules shown in FIG. 3A are realized by the CPU 201 executing the programs expanded to the RAM 203.

A network driver 301 controls the network I/F control unit 205 connected to the network 100, and performs transmission and reception of data to and from the outside via the network 100.

A network control unit 302 controls communications below a transport layer in a network communication protocol such as TCP/IP (Transmission Control Protocol/Internet Protocol), and performs transmission and reception of data.

A communication control unit 303 is a module for controlling a plurality of communication protocols that are supported by the multifunction peripheral 1000. The communication control unit 303 instructs a port control unit 314 to perform opening and blocking of network ports for using a predetermined network communication protocol. Encrypted communications such as TLS (Transport Layer Security) supported by the multifunction peripheral 1000 are also executed by the communication control unit 303. Further, the communication control unit 303 instructs the port control unit 314 to switch soft control according to opening and blocking of the network ports.

A cryptographic processing unit 304 is a module for executing various kinds of cryptographic processes such as a data encryption process, a data decryption process, an electronic signature generation process, an electronic signature verification process, and a hash value generation process. Also, in the encrypted communication process such as TLS executed by the communication control unit 303, the encryption process is performed by the cryptographic processing unit 304.

A printing and reading processing unit 305 is a module for executing functions such as printing performed by the printer 212 and reading of the document performed by the scanner 211.

A device control unit 306 is a module for generating control commands and control data of the multifunction peripheral 1000 and integrally controlling the multifunction peripheral 1000. In the first embodiment of the present invention, instructions for scanning and printing to the multifunction peripheral 1000 can also be executed by the instruction of the user via the operation panel 210.

A UI (User Interface) control unit 307 executes control of the operation panel 210 and the panel control unit 208. Further, the UI control unit 307 (a setting unit) transmits a web page generated by HTML (Hyper Text Markup Language) to an external PC (Personal Computer) and displays it on the screen of a display unit of the external PC.

An authentication management unit 308 (an authentication unit) is a module that performs an authentication processing from the storage apparatus 101, which communicates with the communication control unit 303 through the network 100. Further, the authentication management unit 308 provides connection destination information of the storage apparatus 101 and data to be obtained to a data obtaining unit 309, which will be described later, in response to a command requested from the outside (for example, PDL (Page Description Language) printing).

The data obtaining unit 309 receives the connection destination information, and a job type, which is requested from the storage apparatus 101, from the authentication management unit 308, and performs a processing that issues a data obtaining command to the data obtaining unit 309.

The data obtaining unit 309 is a module for obtaining data from the storage apparatus 101, which communicates with the communication control unit 303 through the network 100. In the first embodiment of the present invention, since network ports other than a prescribed network port are blocked, the data obtaining unit 309 accesses the storage apparatus 101 based on the information provided by the authentication management unit 308, and also obtains data necessary for control and generates a job.

A request processing unit 310 is a module for interpreting and responding to a request from the storage apparatus 101 through the network 100. For example, in the case that the request from the storage apparatus 101 is related to the ability, the request processing unit 310 obtains information corresponding to the request from the storage apparatus 101 from an ability management unit 311, and responds to the storage apparatus 101. Further, in the case that the request from the storage apparatus 101 is related to an apparatus state, the request processing unit 310 obtains information corresponding to the request from the storage apparatus 101 from a state management unit 312, and responds to the storage apparatus 101.

The ability management unit 311 is a module for managing the ability of the multifunction peripheral 1000. The ability of the multifunction peripheral 1000 referred to here is software functions (applications) that are available in the multifunction peripheral 1000, and both hardware and software functions of connected accessories (not shown) and the like. The ability management unit 311 particularly plays a role of managing states of applications permitted and restricted by a function (hereinafter, referred to as "a ZT mode") that forcibly blocks communications with the outside by using the prescribed network port. In addition, the ability management unit 311 also plays a role of obtaining and managing ability information of other multifunction peripherals connected through the network 100, and the ability information also includes whether or not the ZT mode is installed, and whether or not the mode can be set at the time of obtaining. The information of these other multifunction peripherals may be updated on a regular basis. Alternatively, the information of these other multifunction peripherals may be updated in response to an inquiry from the request processing unit 310.

The state management unit 312 is a module for managing the current state of the multifunction peripheral 1000. The state referred to here is a general term for the situation of a warning (for example, a printing sheet remaining amount is small), the situation of an error (for example, a printing sheet jam), their histories, etc. For example, in the case that the state management unit 312 receives the inquiry from the request processing unit 310 when receiving a print request, the state management unit 312 obtains the situation of the warning and the situation of the error regarding the current printing, and responds to the request processing unit 310 based on the obtained situation of the warning and the obtained situation of the error (replies to the request processing unit 310 the result of whether or not the multifunction peripheral 1000 is in a printable state based on the obtained situation of the warning and the obtained situation of the error). The state management unit 312 stores an error state, which is due to trying to use the function restricted by the ZT mode, together with an error code (a job end code). As a result, in the case of receiving a job status confirmation request from the storage apparatus 101 after the job is ended, the state management unit 312 responds to the request processing unit 310 with the job end code.

A hold print control unit 313 is a module for performing control with respect to jobs submitted into the multifunction peripheral 1000 via the network 100. The hold print control unit 313 (a job storing unit) mainly spools (holds) a print job submitted by the application restricted by the ZT mode, and permits printing by causing an owner of the print job to perform device authentication. The hold print control unit 313 obtains a bibliography information list (a job list) of a job group, which is submitted based on authentication information after the device authentication is performed, from the bibliography server 102, and displays it on the operation panel 210. It should be noted that sometimes the print job selected from the job list on the operation panel 210 is not inside the multifunction peripheral 1000, but is, for example, stored in the storage apparatus 101. In this case, the hold print control unit 313 obtains the print job via the data obtaining unit 309, and instructs the printing and reading processing unit 305 and the device control unit 306 to perform printing.

The port control unit 314 is a module group for controlling communications of an application layer in the network communication protocol such as TCP/IP and realizing functions of each application. Specifically, the port control unit 314 includes an HTTPS control unit 314*a* that controls an HTTPS (Hypertext Transfer Protocol Secure) port, a RAW control unit 314*b* that controls a RAW (Read After Write) port, an IPPS control unit 314*c* that controls an IPPS (Internet Printing Protocol Secure) port, and an LPD control unit 314*d* that controls an LPD (Line Printer Daemon) port. Moreover, of course, the port control unit 314 also includes control units corresponding to other network ports, but since the network ports required for the functions installed in the multifunction peripheral 1000 will be described below, the description of the control units corresponding to the other network ports will be omitted.

In the first embodiment of the present invention, the software configuration of the multifunction peripheral 1000 shown in FIG. 3A is configured by the CPU 201, the ROM 202, the RAM 203, the HDD 204, etc. of the multifunction peripheral 1000. Moreover, in the subsequent sequences and flowcharts, processing contents processed by the multifunction peripheral 1000 are stored in any one storage means of the ROM 202, the RAM 203, and the HDD 204, and are executed by the CPU 201.

Figure 3B:
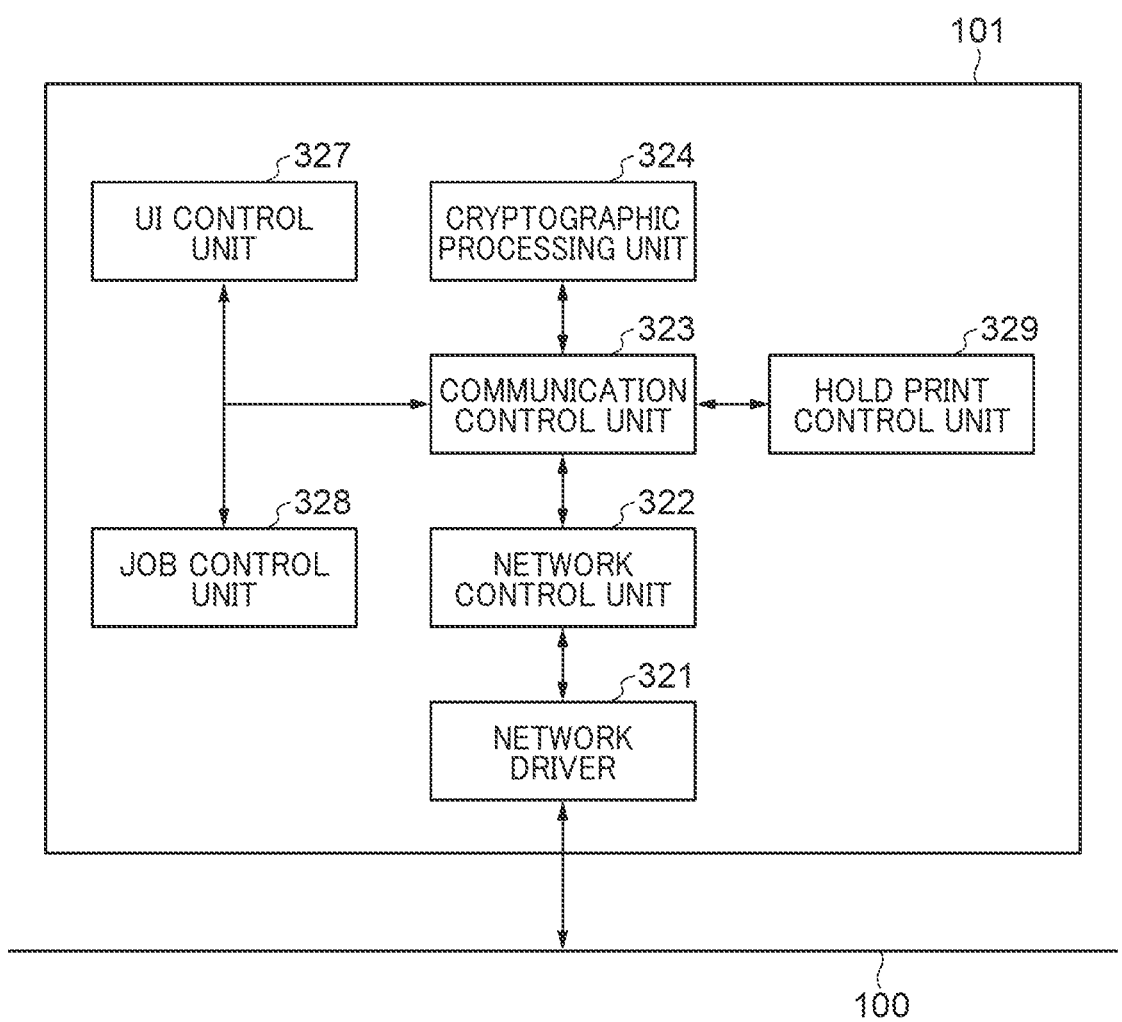
FIG. 3B is a block diagram that shows a software configuration of the storage apparatus of FIG. 1.

FIG. 3B is a block diagram that shows a software configuration of the storage apparatus 101. Moreover, software modules shown in FIG. 3B are realized by the CPU 221 executing the programs expanded to the RAM 223.

A network driver 321 controls the network I/F control unit 225 connected to the network 100, and performs transmission and reception of data to and from the outside via the network 100.

A network control unit 322 controls the communications below the transport layer in the network communication protocol such as TCP/IP, and performs transmission and reception of data.

A communication control unit 323 is a module for controlling a plurality of communication protocols that are supported by the storage apparatus 101. Encrypted communications such as TLS supported by the storage apparatus 101 are also executed by the communication control unit 323.

A cryptographic processing unit 324 is a module for executing various kinds of cryptographic processes such as the data encryption process, the data decryption process, the electronic signature generation process, the electronic signature verification process, and the hash value generation process. Also, in the encrypted communication process such as TLS executed by the communication control unit 323, the encryption process is performed by the cryptographic processing unit 324.

A UI control unit 327 executes control of the operation panel 220 and the panel control unit 228.

A job control unit 328 generates a job according to an input from the UI control unit 327, and transmits the job to another storage apparatus or the multifunction peripheral 1000 through the network 100.

A hold print control unit 329 is a module for performing control with respect to jobs submitted into the storage apparatus 101 via the network 100. The hold print control unit 313 spools (holds) a print job submitted into the storage apparatus 101, and permits display of the bibliography information list (the job list) by causing an owner of the print job to perform device authentication. The hold print control unit 329 obtains a job list of a job group, which is submitted based on authentication information after the device authentication is performed, from the bibliography server 102, and displays it on the operation panel 220.

In the first embodiment of the present invention, the software configuration of the storage apparatus 101 shown in FIG. 3B is configured by the CPU 221, the ROM 222, the RAM 223, the HDD 224, etc. of the storage apparatus 101. Moreover, in the subsequent sequences and flowcharts, processing contents processed by the storage apparatus 101 are stored in any one storage means of the ROM 222, the RAM 223, and the HDD 224, and are executed by the CPU 221.

Figure 3C:
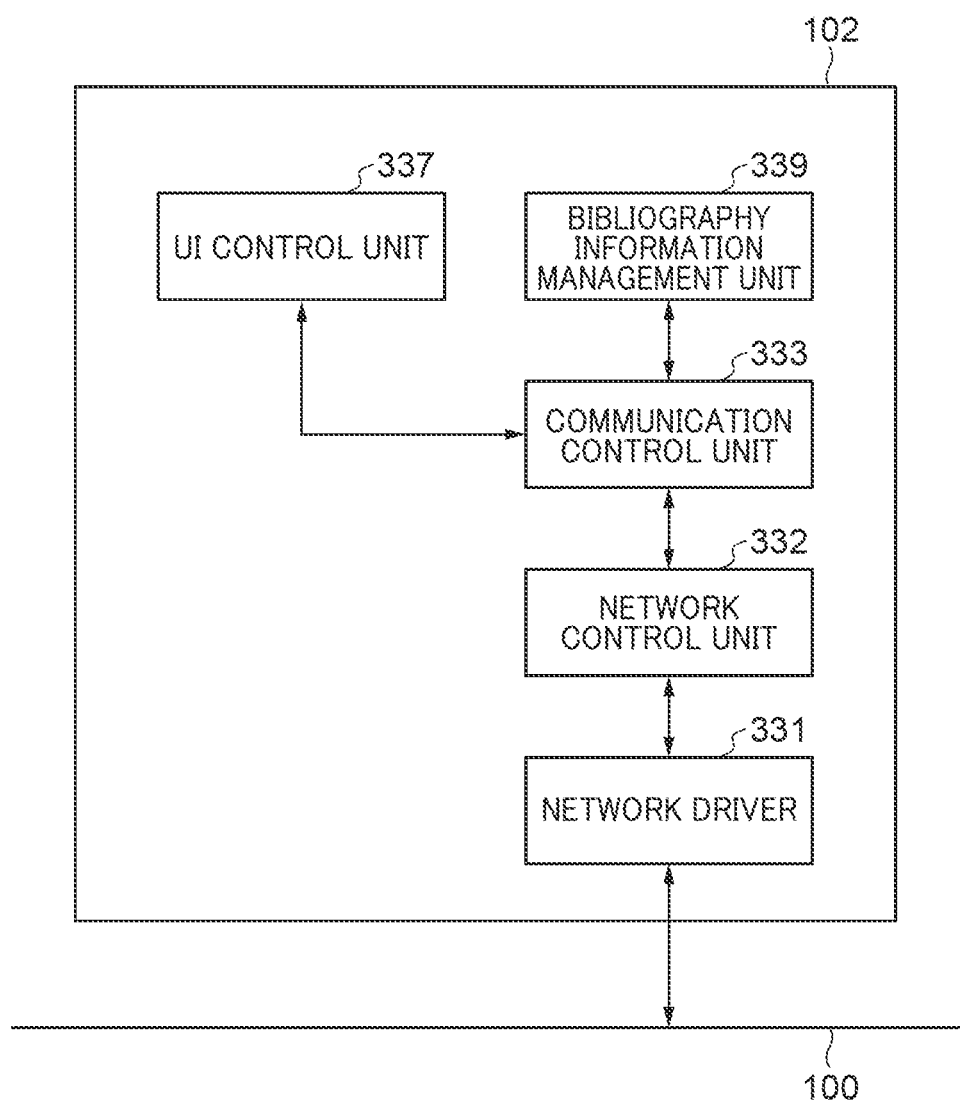
FIG. 3C is a block diagram that shows a software configuration of the bibliography server of FIG. 1.

FIG. 3C is a block diagram that shows a software configuration of the bibliography server 102. Moreover, software modules shown in FIG. 3C are realized by the CPU 231 executing the programs expanded to the RAM 233.

A network driver 331 controls the network I/F control unit 235 connected to the network 100, and performs transmission and reception of data to and from the outside via the network 100.

A network control unit 332 controls the communications below the transport layer in the network communication protocol such as TCP/IP, and performs transmission and reception of data.

A communication control unit 333 is a module for controlling a plurality of communication protocols that are supported by the bibliography server 102. Encrypted communications such as TLS supported by the bibliography server 102 are also executed by the communication control unit 333.

A UI control unit 337 executes control of the operation panel 230 and the panel control unit 238.

A bibliography information management unit 339 is a module for storing and managing bibliography information of the print jobs stored in the multifunction peripheral 1000 and the storage apparatus 101, which are received via the network 100. The bibliography server 102 unitarily manages information of the print jobs, which are stored in the multifunction peripheral 1000 and the storage apparatus 101 that exist in the same network 100, as the bibliography information. As a result, even in the case that the print job is stored in a multifunction peripheral other than the multifunction peripheral 1000, by making an inquiry from the authenticated multifunction peripheral 1000 to the bibliography server 102, it is possible to obtain where and with what print settings the print job is stored.

In the first embodiment of the present invention, the software configuration of the bibliography server 102 shown in FIG. 3C is configured by the CPU 231, the ROM 232, the RAM 233, the HDD 234, etc. of the bibliography server 102. Moreover, in the subsequent sequences and flowcharts, processing contents processed by the bibliography server 102 are stored in any one storage means of the ROM 232, the RAM 233, and the HDD 234, and are executed by the CPU 231.

Figure 4:
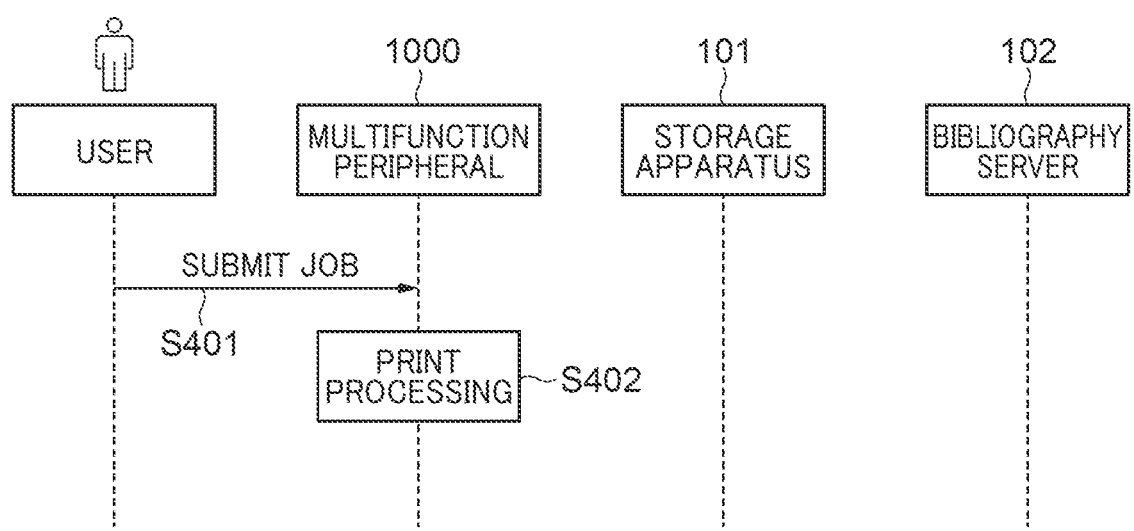
FIG. 4 is a sequence of processes executed in the multifunction peripheral, the storage apparatus, and the bibliography server in the case that a user submits a print job into the multifunction peripheral when a ZT mode is turned off.

The sequences of the multifunction peripheral 1000, the storage apparatus 101, and the bibliography server 102 in the case of receiving a print job in the ZT mode in the system according to the first embodiment of the present invention will be described with reference to FIG. 4, FIG. 5, and FIG. 6.

Here, cases that a print job of an application that is not permitted by the ZT mode is submitted will be clearly described. Specifically, the description will be given in the order of "a case that a print job is submitted when the ZT mode is turned off", "a case that a print job is submitted when the ZT mode is turned on in a conventional system", and "a case that a print job is submitted when the ZT mode is turned on in the system of the first embodiment of the present invention".

Moreover, in any one case of the above cases, each sequence in the multifunction peripheral 1000 is stored in any one storage means of the ROM 202, the RAM 203, and the HDD 204, and is executed by the CPU 201. Further, each sequence in the storage apparatus 101 is stored in any one storage means of the ROM 222, the RAM 223, and the HDD 224, and is executed by the CPU 221. Furthermore, each sequence in the bibliography server 102 is stored in any one storage means of the ROM 232, the RAM 233, and the HDD 234, and is executed by the CPU 231.

Hereinafter, in the sequence of any one case of the above cases, an example, in which the user submits PDL data as a print job from the user's PC (not shown) via a printer driver without authentication by the RAW protocol, will be described.

The ZT mode is one of the functions of the multifunction peripheral 1000 that forcibly blocks the network ports other than the prescribed network port, and accepts only data from a storage apparatus whose security is guaranteed by an SSL (Secure Sockets Layer) (TLS) certificate in advance. The most secure configuration is a case that the number of the prescribed network port is 0 (i.e., a case that all network ports are blocked), and the multifunction peripheral 1000 provides a local copy function. In the first embodiment of the present invention, as the prescribed network port that is not blocked in the ZT mode, the HTTPS port will be described as an example.

The case that a print job is submitted when the ZT mode is turned off will be described. FIG. 4 is a sequence diagram of processes executed in the multifunction peripheral 1000, the storage apparatus 101, and the bibliography server 102 in the case that the user submits a print job into the multifunction peripheral 1000 when the ZT mode is turned off.

In a step S401, the user submits a print job into the multifunction peripheral 1000.

In a step S402, the multifunction peripheral 1000 performs a print processing of the received job.

In this sequence, it is possible to execute printing desired by the user. On the other hand, since it is not authenticated between the PC, which is used by the user to submit the print job, and the multifunction peripheral 1000, if the submitted data is malicious data that falsifies the program, a problem that the multifunction peripheral 1000 will be exposed to threats occurs.

The case that a print job is submitted when the ZT mode is turned on in the conventional system will be described. FIG. 5 is a sequence diagram of processes executed in the multifunction peripheral 1000, the storage apparatus 101, and the bibliography server 102 in the case that the user submits the print job into the multifunction peripheral 1000 when the ZT mode is turned on in the conventional system. Moreover, these processes are achieved by the CPU 201 executing the programs expanded to the RAM 203.

First, in a step S501, a ZT mode shift request by a system administrator to the multifunction peripheral 1000 is accepted. The ZT mode shift request may be made directly to the multifunction peripheral 1000 by the system administrator. Alternatively, the ZT mode shift request may be indirectly made to the multifunction peripheral 1000 via the PC (not shown).

Next, in a step S502, a ZT mode shift processing is executed in the multifunction peripheral 1000. The ZT mode shift processing is started in response to the ZT mode shift request by the system administrator to the multifunction peripheral 1000, which is accepted in the step S501. Moreover, here, an example, in which the ZT mode shift request and a user notification setting indicating that it is in the ZT mode are performed by the system administrator accessing the multifunction peripheral 1000 via the network by using a web browser 700 on the PC (not shown), will be described (see FIG. 7). However, it is also of course possible for the UI control unit 307 to detect that the user has operated the touch panel type operation panel 210 and receive the ZT mode shift request, etc., and the means thereof is not particularly limited.

Figure 5:
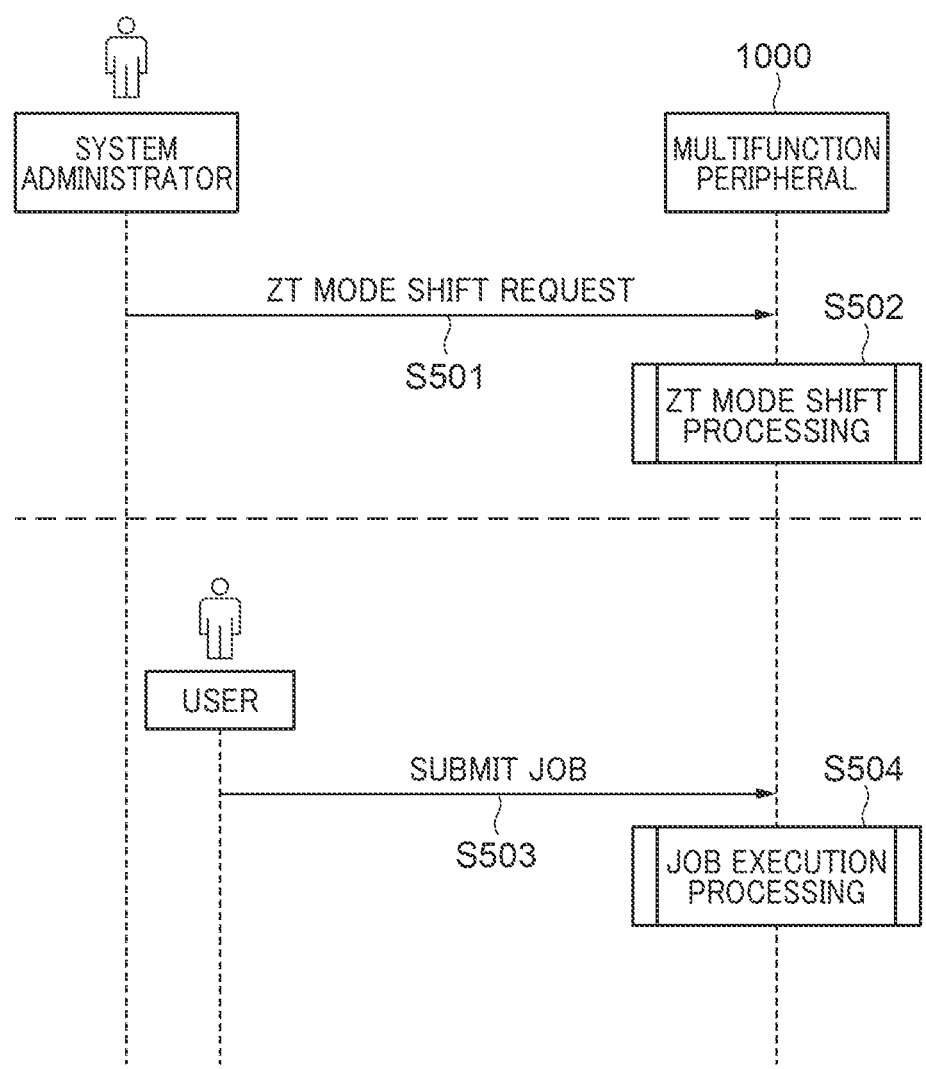
FIG. 5 is a sequence of processes executed in the multifunction peripheral, the storage apparatus, and the bibliography server in the case that the user submits the print job into the multifunction peripheral when the ZT mode is turned on in a conventional system.
Figure 7:
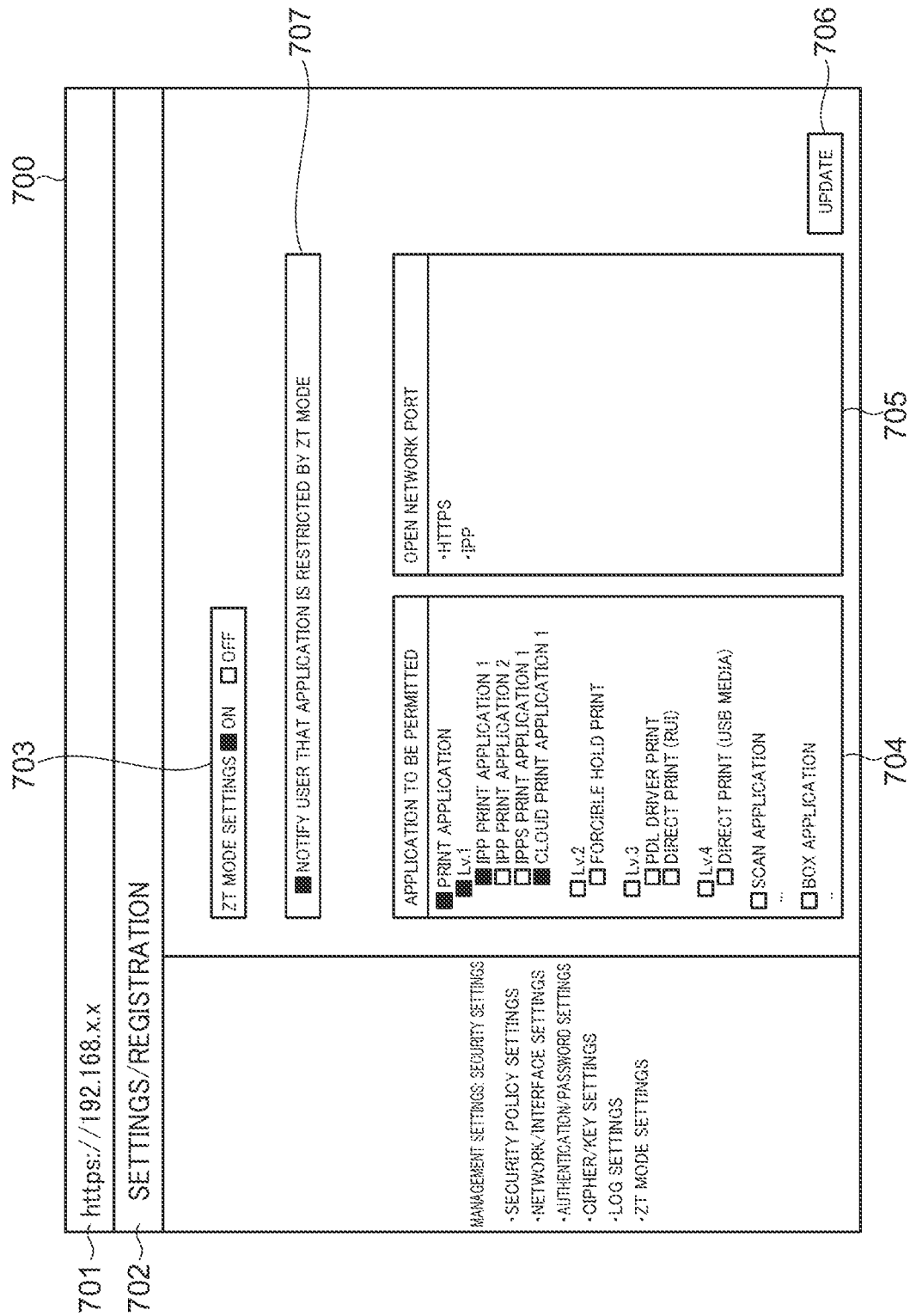
FIG. 7 is a diagram that shows a web page on a web browser that accepts a ZT mode shift request by a system administrator in a step S501 of FIG. 5.

FIG. 7 is a diagram that shows a web page 702 on the web browser 700 that accepts the ZT mode shift request by the system administrator in the step S501 of FIG. 5. The web browser 700 is displayed on the PC (not shown) that is connected to the multifunction peripheral 1000.

As shown in FIG. 7, when an IP address of the multifunction peripheral 1000 is inputted into an address bar 701 by the user, the web page 702 generated by HTML obtained from the UI control unit 307 of the multifunction peripheral 1000 is displayed on the web browser 700. Moreover, the web page 702 is a screen for setting the ZT mode, which is one of security setting screens for the administrator that perform changing and storing setting values of the multifunction peripheral 1000.

The web page 702 includes a ZT mode setting selection region 703, an application-to-be-permitted selection region 704, an open network port display region 705, an update button 706, and a user notification selection region 707.

The ZT mode setting selection region 703 is a region for performing setting change of the ZT mode according to which of ON and OFF check boxes is selected by the user. Specifically, when the ON check box of the ZT mode setting selection region 703 is selected by the user, the ZT mode shift request is transmitted to the multifunction peripheral 1000. When the communication control unit 303 detects this ZT mode shift request, the multifunction peripheral 1000 shifts to the ZT mode.

The user notification selection region 707 is a region for enabling a user notification in the case that the check box is selected in the ZT mode setting selection region 703. Specifically, here, when the user notification becomes enabled, a user notification setting request, which requests the user notification indicating that the ZT mode is set for the user and that there are restrictions on available applications due to the ZT mode, is transmitted to the multifunction peripheral 1000. When the communication control unit 303 detects this user notification setting request, the multifunction peripheral 1000 starts a user notification preparation processing (a step S808).

The application-to-be-permitted selection region 704 is a region for permitting use in the ZT mode of the application selected by the user among a plurality of applications (functions) of the multifunction peripheral 1000 that requires network communications. Here, in the first embodiment of the present invention, the plurality of applications includes print applications, scan applications, box (the whole storage including the inside and outside of the multifunction peripheral 1000) applications, etc. Although the ZT mode can defend against attacks from the outside, when network ports other than network ports (in FIG. 7, the HTTPS port and an IPP (Internet Printing Protocol) port) displayed in the open network port display region 705 are blocked uniformly, available functions are limited. Therefore, in the application-to-be-permitted selection region 704, use in a stepwise way corresponding to the communication protocol and the external apparatus, which is the connection destination, for each application is permitted. The details will be described later with reference to FIG. 10.

The open network port display region 705 is a region for displaying the current open network ports in the ZT mode.

The update button 706 is a button for updating permitted-to-be-used applications in the application-to-be-permitted selection region 704 by pressing down performed by the user. Specifically, when the user presses down the update button 706, the communication control unit 303 detects the current permitted-to-be-used applications in the application-to-be-permitted selection region 704. The details will be described later with reference to FIG. 8.

Figure 8:
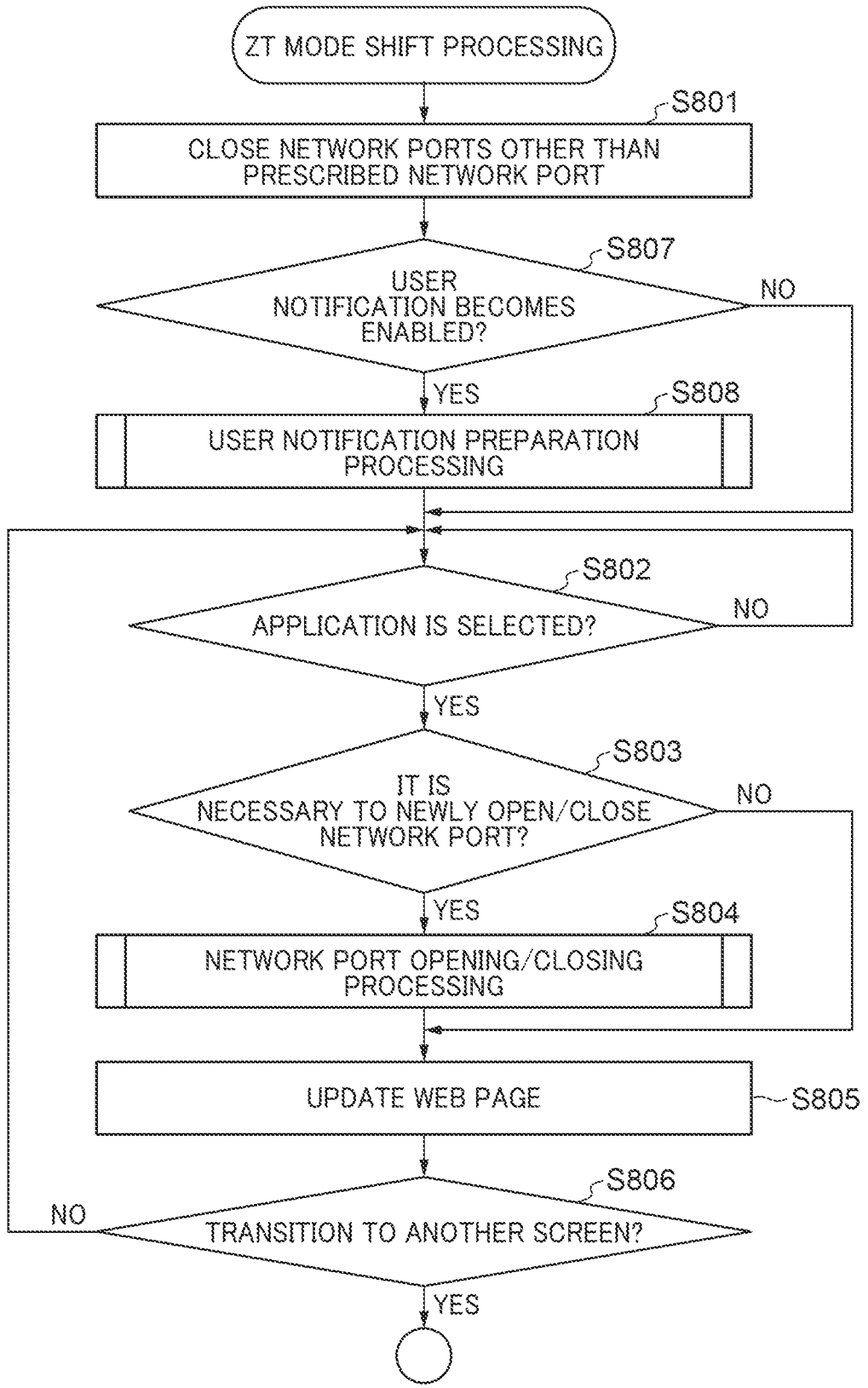
FIG. 8 is a flowchart of a ZT mode shift processing in a step S502 of FIG. 5.

Next, the ZT mode shift processing in the step S502 of FIG. 5 will be described with reference to a flowchart of FIG. 8. Moreover, the ZT mode shift processing is achieved by the CPU 201 expanding the program stored in the ROM 202 or the HDD 204 to the RAM 203 and executing the expanded program.

First, in a step S801, the communication control unit 303 (a communication control unit) shifts to the ZT mode in response to the ZT mode shift request from the external PC. Specifically, when the communication control unit 303 shifts to the ZT mode, the communication control unit 303 instructs the port control unit 314 to block the network ports other than the network port included in the ZT mode shift request from the external PC (i.e., to block the network ports other than the prescribed network port such as the HTTPS port). As a result, since the communication protocols at the network ports blocked in the step S801 in the application layer are limited, it is possible to defend the multifunction peripheral 1000 against the attacks from the outside when the multifunction peripheral 1000 performs data reception.

In a step S807, the communication control unit 303 judges whether or not a check box of the user notification selection region 707 is selected by the user by means of the external PC and whether or not the user notification becomes enabled. Specifically, when the communication control unit 303 detects a setting request from the external PC to notify the user that it is in the ZT mode (i.e., detects the user notification setting request) (YES in the step S807), the ZT mode shift processing shifts to the step S808. On the other hand, in the case that the communication control unit 303 does not detect the user notification setting request (NO in the step S807), the ZT mode shift processing shifts to a step S802.

Figure 9:
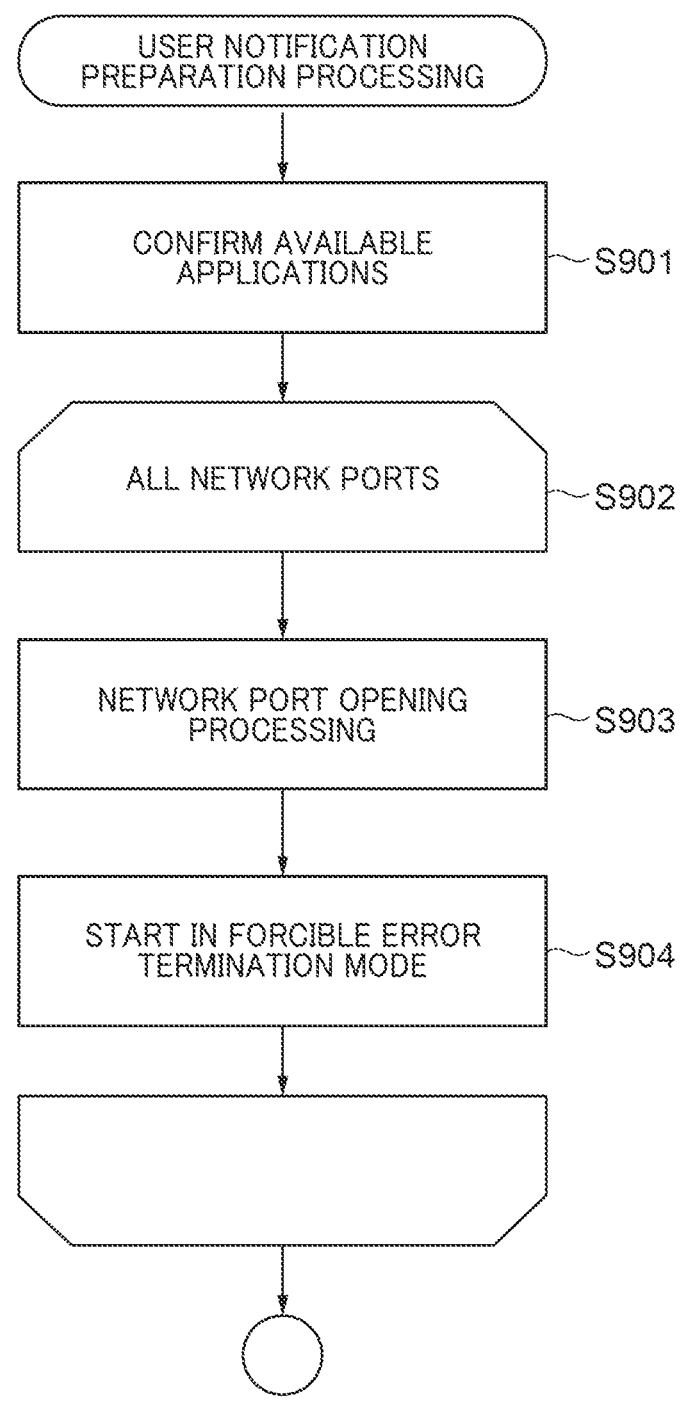
FIG. 9 is a flowchart of a user notification preparation processing in a step S808 of FIG. 8.

In the step S808, the communication control unit 303 performs the user notification preparation processing. The details of the user notification preparation processing will be described with reference to a flowchart of FIG. 9. Moreover, the user notification preparation processing is stored in any one storage means of the ROM 202, the RAM 203, and the HDD 204, and is executed by the CPU 201.

In a step S901, the communication control unit 303 obtains information about the applications available in the multifunction peripheral 1000 (hereinafter, referred to as "application information") from the ability management unit 311. The application information obtained in the step S901 also includes information about the network ports used in the applications. In the first embodiment of the present invention, as the applications available in the multifunction peripheral 1000, print applications shown in FIG. 10 will be described as an example.

FIG. 10 is a table that shows a list of print applications, which are available in the multifunction peripheral 1000, and supported network ports.

Applications permitted at level 1 are print applications based on IPPS and IPP that are provided as standard functions by an OS (Operating System) of the external apparatus, print applications provided by the multifunction peripheral 1000 and an authenticated cloud, etc. Moreover, in the case of enabling these functions, the IPP port or the IPPS port is opened in addition to the HTTPS port.

Applications permitted at level 2 are print applications that are realized within office security such as offices, home-grown clouds, and on-premises servers. Specifically, the applications permitted at level 2 includes forcible hold print applications that hold print data in the PC or the home-grown clouds and print the print data, and on-premises print applications, in which an the on-premises server and the multifunction peripheral operate as a set. Moreover, in the case of enabling these functions, the RAW port is further opened. Generally, the RAW protocol is a non-secure printing protocol, but its security is ensured by the office security.

Applications permitted at level 3 are print applications that are realized by the multifunction peripheral 1000 and the PC directly via the network. Specifically, the applications permitted at level 3 includes a driver print that submits binary data generated from the PC via the printer driver, and a direct print that submits PDF (Portable Document Format) or XPS (XML Paper Specification) with LPR (Line Printer Remote) commands. Moreover, in the case of enabling each print application categorized as level 3, the LPD port is further opened. As with the RAW protocol, the LPD protocol is also a non-secure printing protocol, but its security depends on an environment where the multifunction peripheral 1000 is installed.

Applications permitted at level 4 are print applications such as USB-DEVICE and USB-HOST that directly connect the multifunction peripheral 1000 and the device, and perform printing. Since the printing mode is such that the user directly connects the multifunction peripheral 1000 to his/her own PC or USB (Universal Serial Bus) flash memory and performs printing, the applications permitted at level 4 are applications that the system administrator permits according to the purpose.

Returning to FIG. 9, in a step S902, after repeating processes of steps S903 to S904 for the control units of all network ports other than the network ports used by each application obtained in the step S901, the user notification preparation processing ends. Here, the network ports used by each application obtained in the step S901 are HTTPS and IPP (see FIG. 7). Therefore, the network ports to be processed in the steps S903 to S904 (hereinafter, simply referred to as "target network ports") are the network ports other than the network ports used by each application obtained in the step S901, and for example, are IPPS, RAW, and LPD. However, in the case that the applications obtained in the step S901 also include an application that uses another network port, it goes without saying that the another network port is also excluded from the target network ports.

In the step S903, the communication control unit 303 requests the port control unit 314 to open the target network ports (here, the above three network ports, i.e., IPPS, RAW, and LPD). In response to this request, the RAW control unit 314*b*, the IPPS control unit 314*c*, and the LPD control unit 314*d* in the port control unit 314 perform a network port opening processing.

In the step S904, the port control unit 314 requests the control units (hereinafter, the RAW control unit 314*b* will be described as an example) that have performed the network port opening processing in the step S903 to start in a forcible error termination mode. In response to this request, the RAW control unit 314*b* starts in the forcible error termination mode. Here, the forcible error termination mode is a mode, in which the RAW control unit 314*b* establishes a connection with the PC that is a job submitting source from the user and then (forcibly) performs error termination without performing actual processing such as interpretation and control of transmitted data. As a result, job information submitted via the RAW port is discarded without being interpreted by the multifunction peripheral 1000, and a job end code, which will be described later, remains in the multifunction peripheral 1000 as a record of performing the error termination.

Returning to FIG. 8, in the step S802, when the user presses down the update button 706, the communication control unit 303 detects the current permitted-to-be-used applications in the application-to-be-permitted selection region 704. Here, a case, in which the user selects an IPP print application 1 and a cloud print application 1 of print application Lv. 1 in the application-to-be-permitted selection region 704 (see FIG. 7) and then presses down the update button 706, will be described.

In a step S803, the communication control unit 303 (an opening/closing processing unit) compares the network ports used in the current permitted-to-be-used applications with the current open network ports, and judges whether or not it is necessary to newly open or close the network port. Here, in the case that application selection is added in the application-to-be-permitted selection region 704, it is judged whether or not there is a network port that needs to be opened additionally. Further, in the case that the application selection is partially released in the application-to-be-permitted selection region 704, it is judged whether or not there is a network port that can be blocked among the current open network ports.

Figure 11:
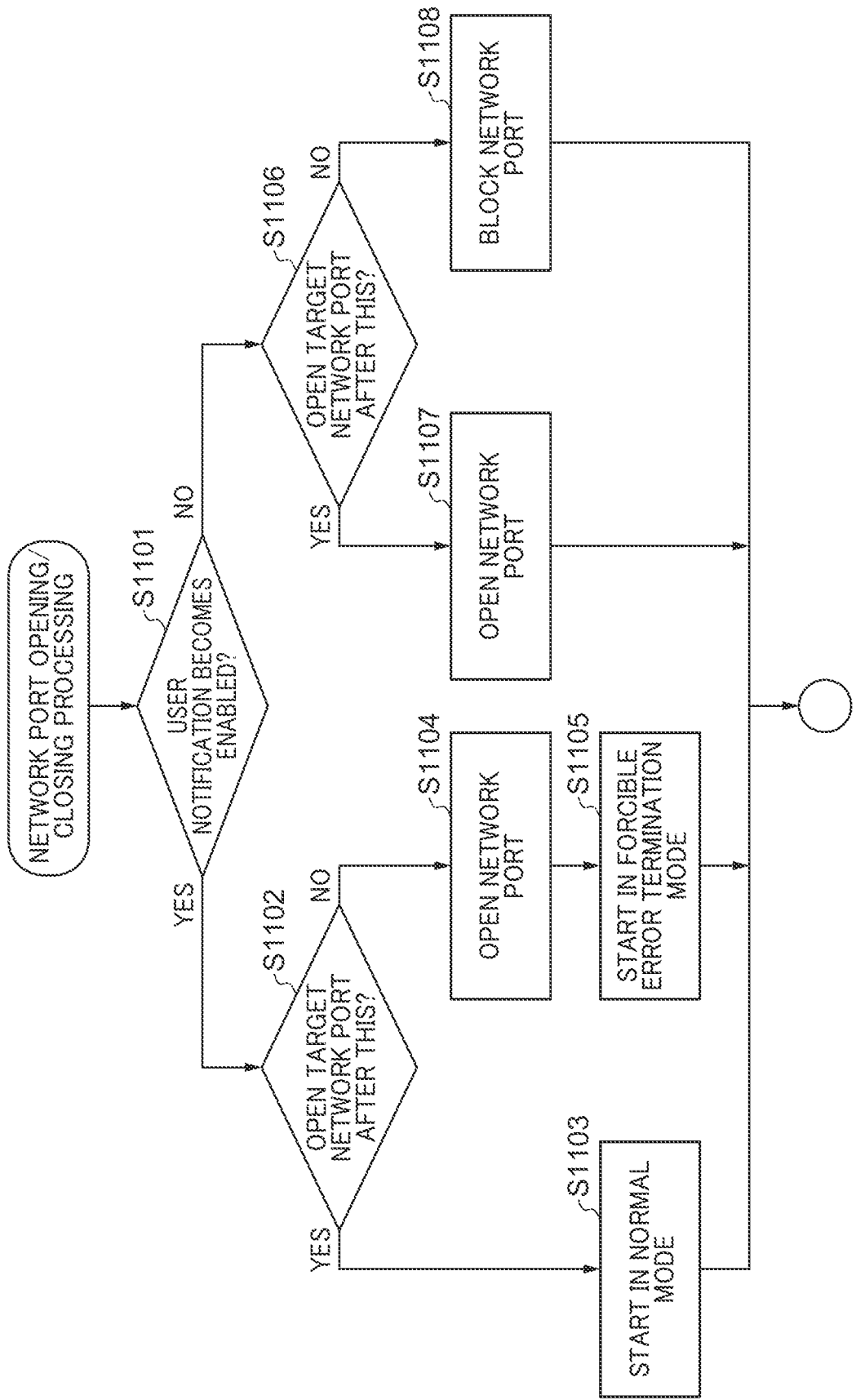
FIG. 11 is a flowchart of a network port opening/closing processing in a step S804 of FIG. 8.

In the case that it is not necessary to newly open or close the network port (NO in the step S803), the ZT mode shift processing shifts to a step S805. On the other hand, in the case that it is necessary to newly open or close the network port (YES in the step S803), the ZT mode shift processing shifts to a network port opening/closing processing of a step S804. In the first embodiment of the present invention, the above-described two applications (the IPP print application 1 and the cloud print application 1) are selected immediately after shifting to the ZT mode (only the HTTPS port). Therefore, the communication control unit 303 judges that it is necessary to open the IPP port required for IPP printing (YES in the step S803), and requests the port control unit 314 to open the IPP port. In response to this request, the port control unit 314 executes the network port opening/closing processing, and an IPP control unit opens the IPP port. Hereinafter, the network port opening/closing processing will be described with reference to a flowchart of FIG. 11. Moreover, the flowchart of FIG. 11 is stored in any one storage means of the ROM 202, the RAM 203, and the HDD 204, and is executed by the CPU 201.

First, in a step S1101, the communication control unit 303 classifies the control according to whether or not it is judged in the step S807 that the user notification becomes enabled. Specifically, in the case that it is judged that the user notification becomes enabled (YES in the step S1101), the network port opening/closing processing shifts to a step S1102, and on the other hand, in the case that it is not judged that the user notification becomes enabled (NO in the step S1101), the network port opening/closing processing shifts to a step S1106.

In the step S1102, the communication control unit 303 classifies the control according to whether or not it is judged in the step S803 that it is necessary to newly open the network port. Specifically, in the case that it is judged that it is necessary to newly open the network port (YES in the step S1102), the network port opening/closing processing shifts to a step S1103. On the other hand, in the case that it is judged that it is necessary to block the open network port (NO in the step S1102), the network port opening/closing processing shifts to a step S1104.

Here, the case that it is judged in the step S1102 that it is necessary to newly open the network port, is a case that the application is newly selected in the step S802. Therefore, in the step S1103, the communication control unit 303 requests the port control unit 314 to start the newly selected application in a normal mode, and then ends the network port opening/closing processing of FIG. 11. In response to this request, the target control unit in the port control unit 314, that is, the control unit of the network port used in the newly selected application, starts in the normal mode. Starting in the normal mode means normal starting of the application including the opening processing of the network port to be used in the port control unit 314. That is, the normal mode is a mode, in which the target control unit establishes a connection with the storage apparatus 101 that is a request source and then performs the actual processing such as interpretation and control of the transmitted data.

On the other hand, the case that it is judged in the step S1102 that it is necessary to block the open network port, is a case that the application already selected in the step S802 is released. Therefore, in the step S1104, the communication control unit 303 requests the port control unit 314 to open the network port used in the released application. In response to this request, the control unit of the network port to be opened (hereinafter, "the network port to be opened" is simply referred to as "the network port being an opening target") in the port control unit 314 opens the network port being the opening target.

In a step S1105, the port control unit 314 requests the control unit of the network port being the opening target to start in the forcible error termination mode, and then ends the network port opening/closing processing of FIG. 11. In response to this request, the control unit of the network port being the opening target starts in the forcible error termination mode (the step S1105).

In the step S1106, the communication control unit 303 classifies the control according to whether or not it is judged in the step S803 that it is necessary to newly open the network port. Specifically, in the case that it is judged that it is necessary to newly open the network port (YES in the step S1106), the network port opening/closing processing shifts to a step S1107. On the other hand, in the case that it is judged that it is necessary to block the open network port (NO in the step S1106), the network port opening/closing processing shifts to a step S1108.

Here, the case that it is judged in the step S1106 that it is necessary to block the open network port, is the case that the application already selected in the step S802 is released. Therefore, in the step S1107, the communication control unit 303 requests the port control unit 314 to open the network port used in the released application, and then ends the network port opening/closing processing of FIG. 11. In response to this request, the control unit of the network port being the opening target in the port control unit 314 opens the network port being the opening target.

In the step S1108, the communication control unit 303 requests the port control unit 314 to block the network port used in the released application, and then ends the network port opening/closing processing of FIG. 11. In response to this request, the control unit of the network port to be blocked (hereinafter, "the network port to be blocked" is simply referred to as "the network port being a blocking target") in the port control unit 314 blocks the network port being the blocking target.

As described above, when the network port opening/closing processing of FIG. 11 is completed, returning to FIG. 8, in the step S805, the communication control unit 303 updates the web page 702 displayed on the PC, and causes the open network port display region 705 to display the current open network ports.

In a step S806, after updating the web page 702, the communication control unit 303 judges whether or not there is a transition to another screen of the web page 702 or closing of the web browser 700. In the case that there is no the transition to another screen of the web page 702 or the closing of the web browser 700 (NO in the step S806), the ZT mode shift processing returns to the step S802. As a result, it is waited for that the application is newly selected by the user in the application-to-be-permitted selection region 704. On the other hand, in the case that there is the transition to another screen of the web page 702 or the closing of the web browser 700 (YES in the step S806), the communication control unit 303 ends the ZT mode shift processing of FIG. 8.

As described above, the ZT mode shift processing of the multifunction peripheral 1000 according to the instruction of the system administrator has been described with reference to the steps S501 to S502 of FIG. 5, FIG. 7, FIG. 8, and FIG. 9.

Subsequently, returning to FIG. 5, in a step S503, the job submitted into the multifunction peripheral 1000 from the user's PC is accepted.

Next, in a step S504, a job execution processing is executed in the multifunction peripheral 1000. In the job execution processing referred to here, the job generated by the user's PC is unidirectionally submitted into the multifunction peripheral 1000 with respect to the network port of the multifunction peripheral 1000 in the ZT mode. Therefore, although the details will be described later with reference to FIG. 12, in the case that the job is a job of the application permitted by the multifunction peripheral 1000, the job is executed normally, and on the other hand, in the case that the job is not the job of the application permitted by the multifunction peripheral 1000, the job is forcibly error-terminated.

Figure 12:
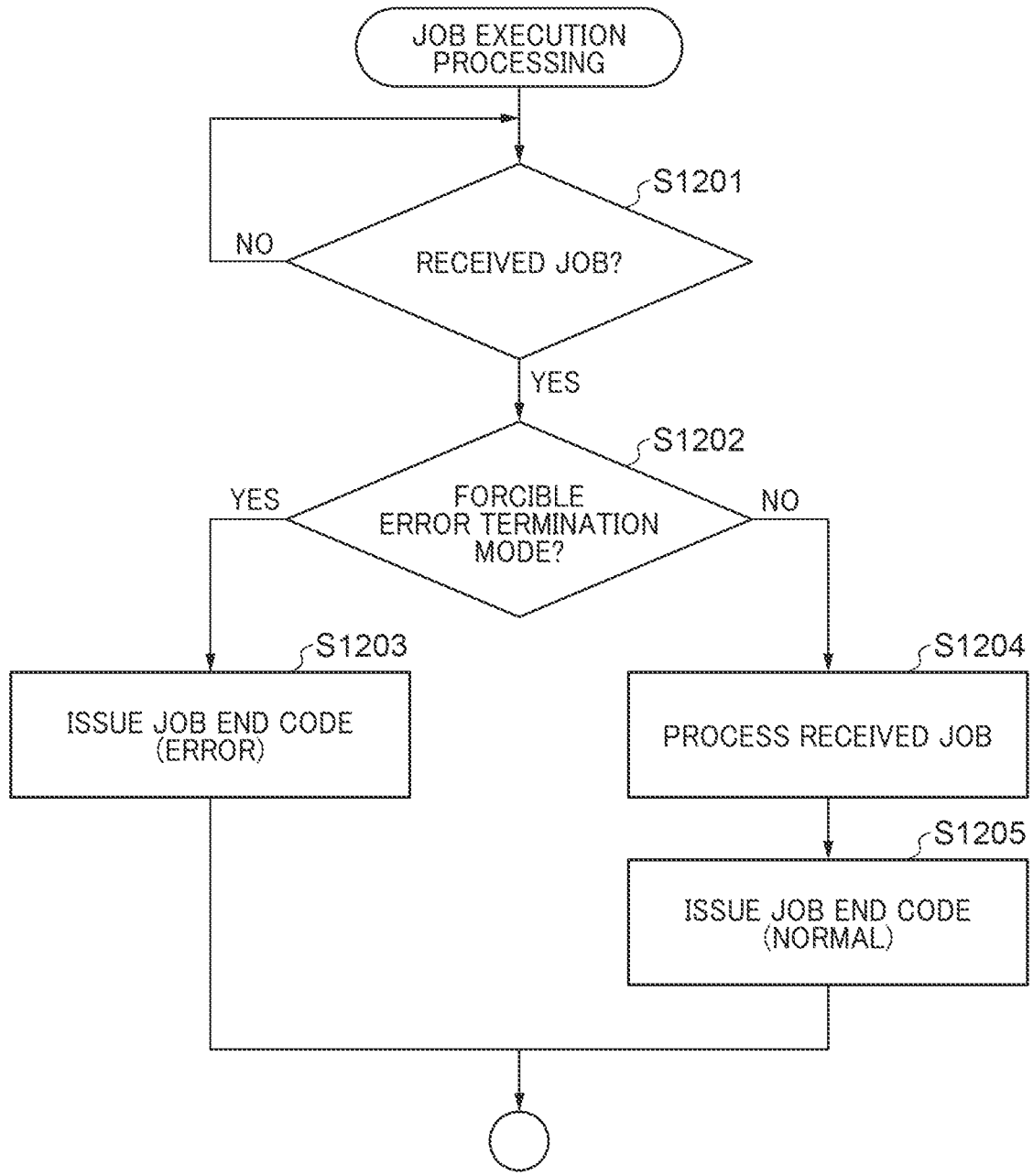
FIG. 12 is a flowchart of a job execution processing in a step S504 of FIG. 5.

Hereinafter, a case shown in FIG. 7 that permission to use the IPP print application 1 and the cloud print application 1 in the ZT mode of the multifunction peripheral 1000 is selected on the web page 702 will be described with reference to FIG. 12. As shown in FIG. 10, the network ports used in the IPP print application 1 and the cloud print application 1 are HTTPS and IPP. Therefore, the control units of the network ports other than HTTPS and IPP (the control units other than the HTTPS control unit 314a and the IPP control unit (not shown in FIG. 3A) in the port control unit 314) are currently in the forcible error termination mode due to the user notification preparation processing of FIG. 9. Moreover, the job execution processing is achieved by the CPU 201 expanding the program stored in the ROM 202 or the HDD 204 to the RAM 203 and executing the expanded program.

First, in a step S1201, the request processing unit 310 waits until the job is received in the step S503, and when the job is received, requests the port control unit 314 to perform the processing corresponding to the network port into which the job is submitted (hereinafter, referred to as "a job submission destination port").

Next, in a step S1202, the port control unit 314 judges whether or not the control unit of the job submission destination port is in the forcible error termination mode. Here, the case that the control unit of the job submission destination port is in the forcible error termination mode means that a job of the application other than the applications permitted by the system administrator by using the web page 702 of FIG. 7 has been submitted. For example, in the case that the job received in the step S1201 is a print job submitted by the LPR command from the PC, the control unit of the job submission destination port (the LPD port) is the LPD control unit 314d which is currently in the forcible error termination mode. Therefore, in this case (YES in the step S1202), the job execution processing shifts to a step S1203.

In the step S1203, the control unit of the job submission destination port discards application data included in the job received in the step S1201 without interpreting it (i.e., forcibly terminates the job), and issues a job end code (error) to the UI control unit 307. After that, the job execution processing ends.

Hereinafter, a screen 130 including job history information displayed on the operation panel 210 by the UI control unit 307 in the case that the job end code (error) is issued in the step S1203 will be described with reference to FIG. 13.

Figure 13:
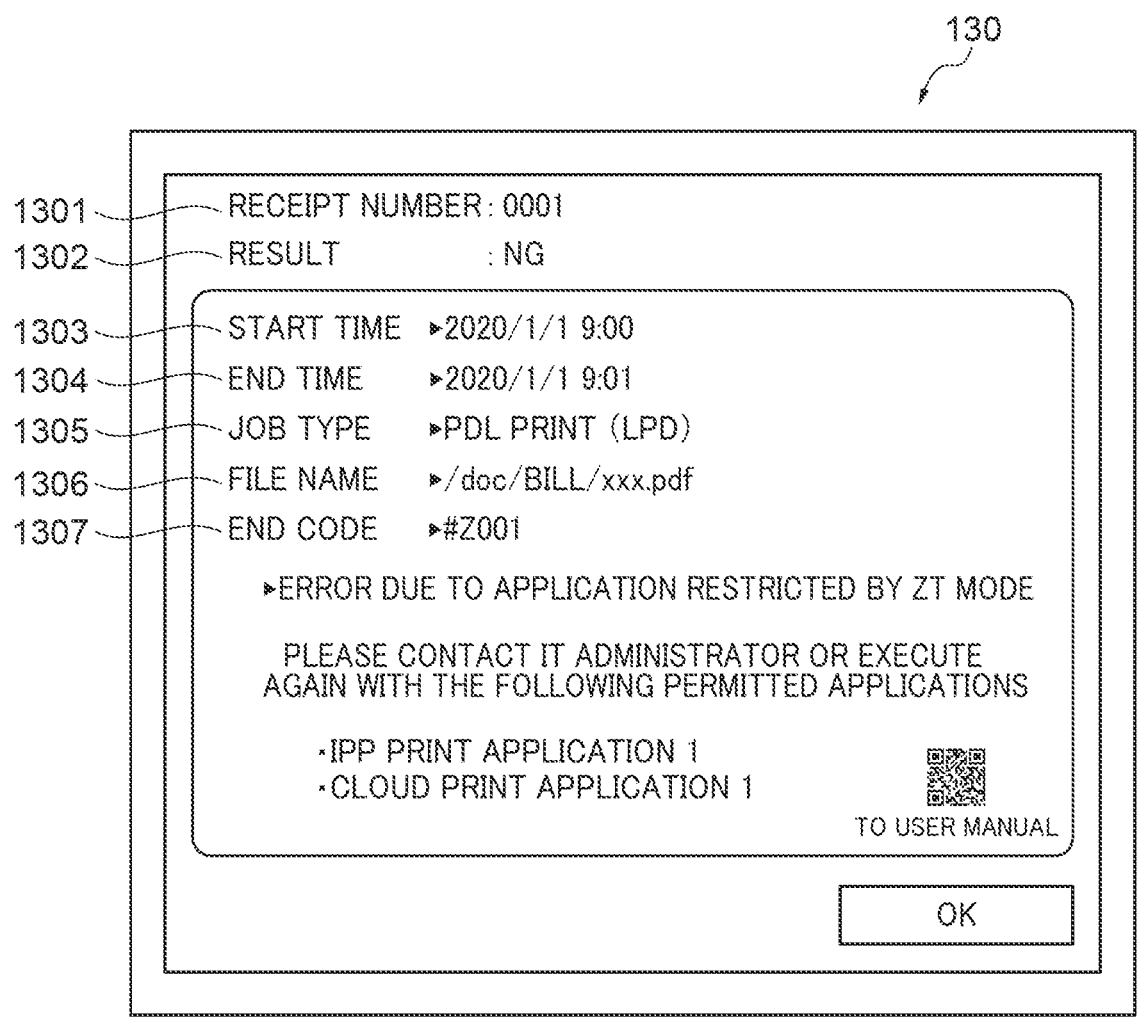
FIG. 13 is a diagram that shows a screen including job history information displayed on an operation panel by a UI control unit in the case that a job end code (error) is issued in a step S1203 of FIG. 12.

As shown in FIG. 13, the screen 130 includes the job history information such as a receipt number 1301, a result 1302, a start time 1303, an end time 1304, a job type 1305, a file name 1306, and an end code 1307.

The receipt number 1301 indicates a serial number when the job is accepted.

The result 1302 indicates that the job has ended normally (in this case, "OK" is displayed) or that the job has been error-terminated (in this case, "NG" is displayed). In the first embodiment of the present invention, since the job end code (error) is issued to the UI control unit 307 in the step S1203, "NG" is displayed in the result 1302.

The start time 1303 and the end time 1304 indicate a processing start time and a processing end time of the job, respectively.

The job type 1305 indicates the job type of the submitted job. In the first embodiment of the present invention, since the print job for the LPD port has been submitted in the step S503, "PDL print (LPD)" is displayed in the job type 1305.

The file name 1306 indicates a job name.

The end code 1307 indicates a job end code issued without normal end, an error summary, and an error avoidance means. In the first embodiment of the present invention, "#Z001" is displayed as the job end code, and below the job end code, it is displayed that the job has been error-terminated due to the ZT mode as the error summary. Further, below the error summary, a message, which asks the system administrator to set it as a permitted application or prompts to use the permitted application, is displayed as the error avoidance means.

Furthermore, as shown in FIG. 13, the screen 130 may show a QR code (registered trademark) for accessing an online manual as an introduction to a user manual on how to use the permitted application. Moreover, if the online manual can be accessed, the introduction to the user manual on how to use the permitted application is not limited to the QR code displayed on the screen 130, and for example, a hyperlink or the like may be used.

Moreover, such a configuration may be adopted, that is, the job history information including the job end code, which is displayed on the screen 130, is managed by the state management unit 312, and in response to the request from the external PC, the request processing unit 310 obtains the job history information from the state management unit 312 and returns this as a response. As a result, it is also possible to display the processing result of the job submitted into the multifunction peripheral 1000 on the external PC.

Returning to FIG. 12, for example, in the case that a print job generated by the cloud print application 1 is received from the PC in the step S1201, the control unit of the job submission destination port (the HTTPS port) is the HTTPS control unit 314a which is not currently in the forcible error termination mode. Therefore, in this case (NO in the step S1202), the job execution processing shifts to a step S1204.

In the step S1204, the control unit of the job submission destination port processes the job received in the step S1201. For example, in the case that the control unit of the job submission destination port is the HTTPS control unit 314a in the step S1201, the HTTPS control unit 314a extracts print data from the print job, and the printing and reading processing unit 305 and the device control unit 306 execute printing of the extracted print data. After that, when the processing of the job received in the step S1201 ends normally, the job execution processing proceeds to a step S1205. Moreover, the description of the case that the processing of the job performed in the step S1204 has been error-terminated will be omitted.

In the step S1205, a job end code (normal) indicating that the processing of the job received in the step S1201 has ended normally is issued to the UI control unit 307. In this case, the UI control unit 307 displays a screen that shows job history information indicating that the processing of the job has ended normally. Since the screen displayed at this time is the same as the screen 130 of FIG. 13 except that it indicates that the processing of the job has ended normally, the description thereof will be omitted.

As described above, in the case that the ZT mode is turned on, in the conventional system, when a print job generated by an application that is not permitted by the system administrator is submitted into the multifunction peripheral 1000, the print job will not be executed and will be error-terminated.

The case that a print job is submitted when the ZT mode is turned on in the system of the first embodiment of the present invention will be described. FIG. 6 is a sequence of processes executed in the multifunction peripheral 1000, the storage apparatus 101, and the bibliography server 102 in the case that the user submits a job into the multifunction peripheral 1000 when the ZT mode is turned on in the system of the first embodiment of the present invention. Moreover, these processes are achieved by the CPU 201 executing the programs expanded to the RAM 203. Hereinafter, the same numbering will be used for the same steps as in FIG. 5, and duplicate explanations will be omitted.

First, in steps S601 and S602, the same processes as in the steps S501 and S502 of FIG. 5 are executed. However, the ZT mode shift request and the user notification setting indicating that it is in the ZT mode are performed by the system administrator accessing the multifunction peripheral 1000 via the network by using a web page 702a of FIG. 14 instead of the web page 702 of FIG. 7. Moreover, it is also of course possible for the UI control unit 307 to detect that the user has operated the touch panel type operation panel 210 and receive the ZT mode shift request, etc., and the means thereof is not particularly limited.

Figure 6:
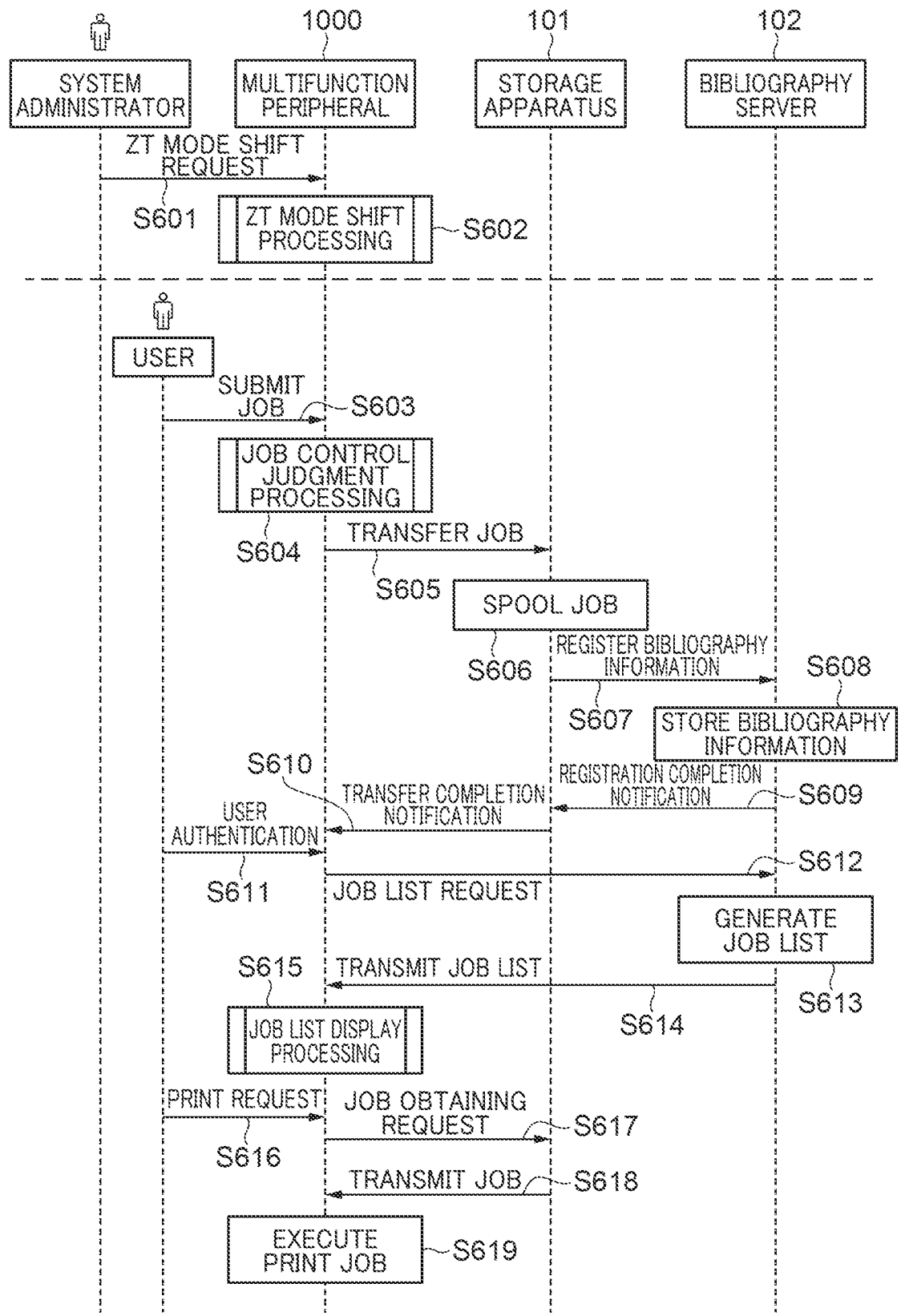
FIG. 6 is a sequence of processes executed in the multifunction peripheral, the storage apparatus, and the bibliography server in the case that the user submits a job into the multifunction peripheral when the ZT mode is turned on in the system of the first embodiment.
Figure 14:
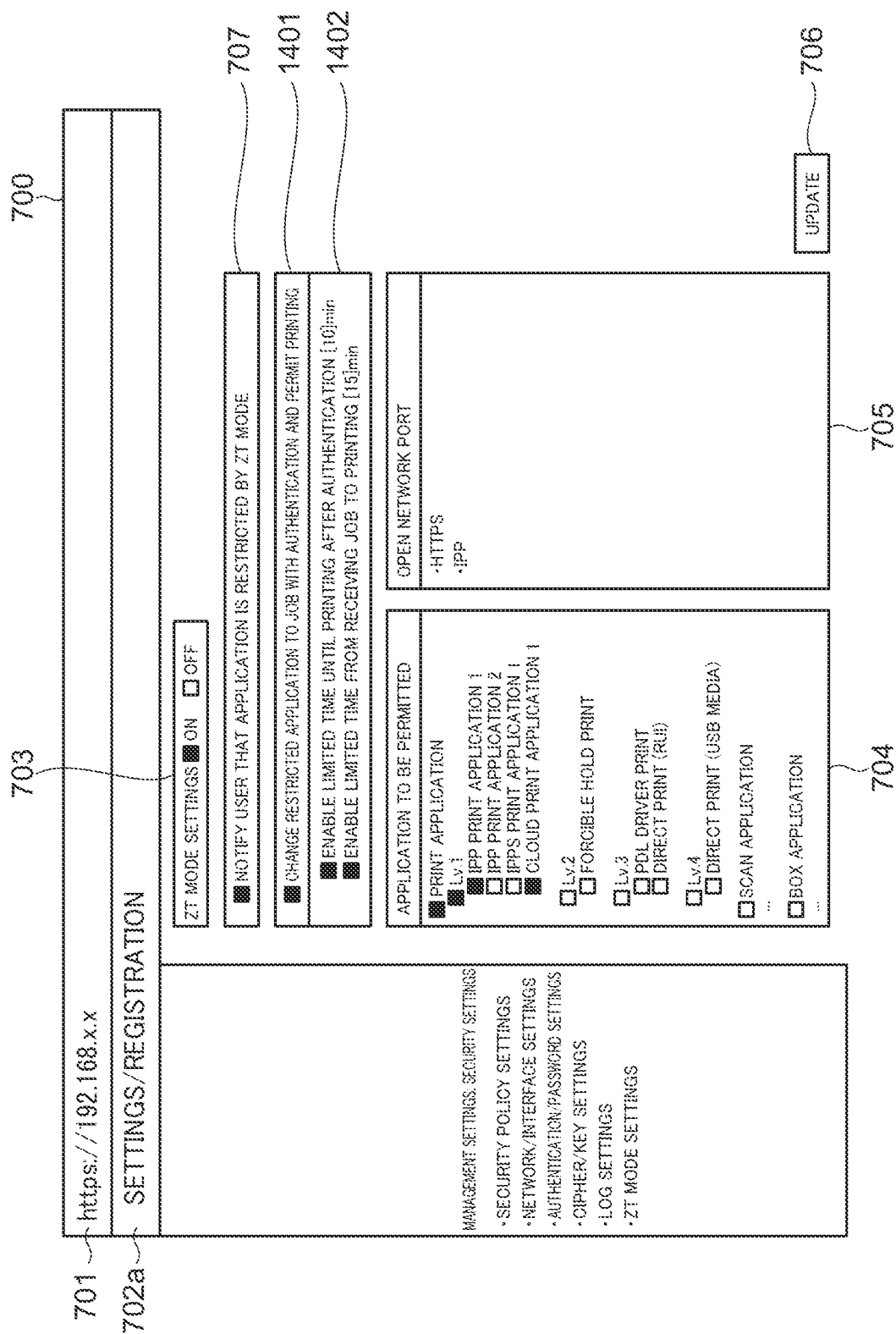
FIG. 14 is a diagram that shows a web page on the web browser that accepts the ZT mode shift request by the system administrator in a step S601 of FIG. 6.

FIG. 14 is a diagram that shows the web page 702a on the web browser 700 that accepts the ZT mode shift request by the system administrator in the step S601 of FIG. 6. In the web page 702a, the same numbering is used for the same configuration as the web page 702, and duplicate explanations are omitted.

In addition to the configurations shown in FIG. 7, the web page 702a includes a print permission setting region 1401 and a limited time setting region 1402.

The print permission setting region 1401 is a region for selecting whether or not to enable a job-with-authentication change setting. The job-with-authentication change setting referred to here is a setting, in which when a job of an application that is not permitted by the application-to-be-permitted selection region 704 is submitted, this job is changed to a job that requires authentication (hereinafter, simply referred to as "a job with authentication"), and printing of the job with authentication is permitted. Specifically, when a check box in the print permission setting region 1401 is selected by the user, the job-with-authentication change setting becomes enabled.

The limited time setting region 1402 is a region for setting a time constraint on the authentication in the case that the job-with-authentication change setting is enabled. That is, the system administrator can select whether or not to enable a time constraint function, which does not permit printing if there is no print request of the job with authentication by a predetermined time after the authentication (hereinafter, referred to as "a first limited time"), in the limited time setting region 1402. Further, the system administrator can also select whether or not to enable a time constraint function, which does not permit printing if there is no print request of the job with authentication by a predetermined time after receiving the job (hereinafter, referred to as "a second limited time"), in the limited time setting region 1402. Furthermore, it is also possible to set the first limited time and the second limited time in the limited time setting region 1402.

In the example of FIG. 14, the system administrator enables the job-with-authentication change setting in the print permission setting region 1401. In addition, the system administrator imposes restriction on the user to perform the authentication with respect to the job with authentication within 15 minutes from job reception and perform printing within 10 minutes from the authentication in the limited time setting region 1402.

Subsequently, returning to FIG. 6, in a step S603, the job submitted into the multifunction peripheral 1000 by the user from the PC is accepted.

Next, in a step S604, a job control judgment processing is executed in the multifunction peripheral 1000. Hereinafter, the job control judgment processing will be described with reference to a flowchart of FIG. 15.

Hereinafter, a case shown in FIG. 14 that permission to use the IPP print application 1 and the cloud print application 1 in the ZT mode of the multifunction peripheral 1000 is selected on the web page 702a will be described with reference to FIG. 15. As shown in FIG. 10, the network ports used in the IPP print application 1 and the cloud print application 1 are HTTPS and IPP. Therefore, the control units of the network ports other than HTTPS and IPP (the control units other than the HTTPS control unit 314a and the IPP control unit in the port control unit 314) are currently in the forcible error termination mode due to the user notification preparation processing of FIG. 9. Moreover, the job control judgment processing is achieved by the CPU 201 expanding the program stored in the ROM 202 or the HDD 204 to the RAM 203 and executing the expanded program.

Moreover, since the steps S1201, S1202, S1204, and S1205 in FIG. 15 have already been described with reference to FIG. 12, the description thereof will be omitted.

Figure 15:
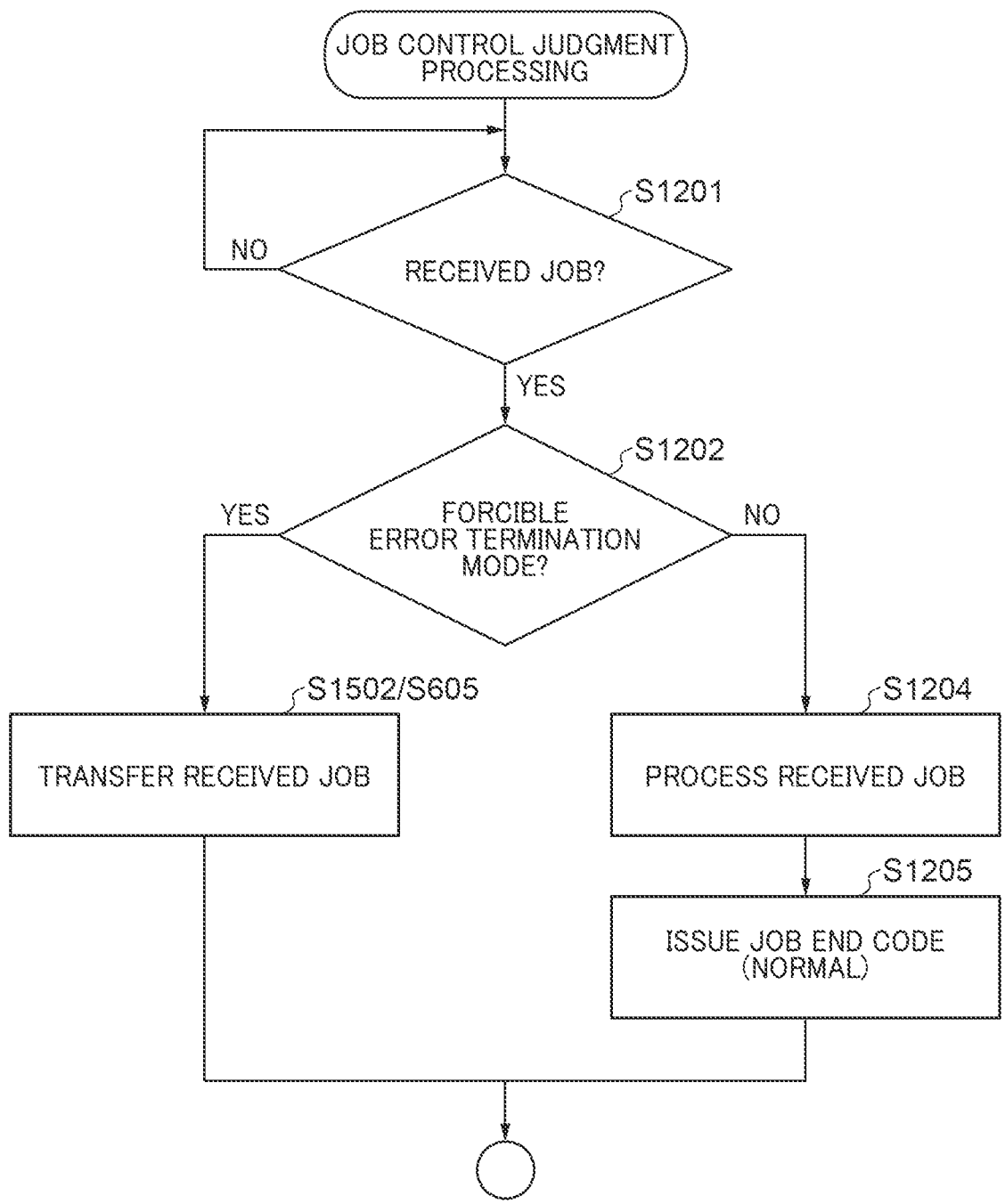
FIG. 15 is a flowchart of a job control judgment processing in a step S604 of FIG. 6.

As shown in FIG. 15, in the case that the control unit of the job submission destination port is in the forcible error termination mode (YES in the step S1202), the job control judgment processing proceeds to a step S1502 (a step S605), and the hold print control unit 313 transfers the received job to the storage apparatus 101 (the external apparatus). After that, the job control judgment processing ends. For example, in the case that the job received in the step S1201 is a print job submitted by the LPR command from the PC, the LPD control unit 314d transmits the job to the storage apparatus 101 via the LPD port with the same settings. In this way, in the job control judgment processing, unlike the case of the step S1203 of FIG. 12, the control unit of the job submission destination port, which starts in the forcible error termination mode, transfers the job to the storage apparatus 101 instead of forcibly terminating the job immediately.

Moreover, in the first embodiment of the present invention, in the case that it is judged in the step S1202 that the control unit of the job submission destination port is not in the forcible error termination mode, after the processes of the steps S1204 and S1205 are completed, the sequence of FIG. 6 ends. That is, the processes of the step S605 and subsequent steps are not performed.

Returning to FIG. 6, in a step S606, the hold print control unit 329 of the storage apparatus 101 spools the job, which is transferred from the multifunction peripheral 1000 in the step S605 (the step S1502), to the internal storage such as the HDD 224. At this time, after spooling the job, as the bibliography information, the hold print control unit 329 obtains the job name, a reception time and date, owner information set in the job, user information such as a domain name and a computer name, and print setting information such as the number of printing copies and a page orientation.

In a step S607, the communication control unit 323 of the storage apparatus 101 transmits the bibliography information obtained in the step S606 to the bibliography server 102 for registration.

In a step S608, the bibliography information management unit 339 of the bibliography server 102 stores the bibliography information received from the storage apparatus 101 in the internal storage such as the HDD 234.

In a step S609, after the bibliography information has been stored in the step S608, the communication control unit 333 of the bibliography server 102 notifies the storage apparatus 101 that storing of the bibliography information is completed.

In a step S610, the communication control unit 323 of the storage apparatus 101 notifies the multifunction peripheral 1000 that spooling of the job transferred from the multifunction peripheral 1000 in the step S605 and bibliography information registration to the bibliography server 102 are completed. In response to this notification, the UI control unit 307 instructs the panel control unit 208 to display a login screen on the operation panel 210.

By the above steps S603 to S610, the job submitted into the multifunction peripheral 1000 by the user from the PC is stored in each of the storage apparatus 101 and the bibliography server 102 without being forcibly terminated as in the conventional step S1203.

With reference to a step S611 and subsequent steps, the flow from selecting a job from the job list displayed on the operation panel 210 of the multifunction peripheral 1000 performed by the user to printing will be described.

In the step S611, the panel control unit 208 of the multifunction peripheral 1000 accepts inputting of the user information such as a user ID and a password into the above login screen performed by the user, and the authentication management unit 308 performs user authentication based on the accepted user information. Moreover, although the details are omitted here, the processes of a step S612 and subsequent steps are performed only in the case that the user authentication is successful.

In the step S612, the hold print control unit 313 of the multifunction peripheral 1000 transmits a request to obtain jobs owned by the user including the user information accepted in the step S611 (hereinafter, simply referred to as "a job obtaining request") to the bibliography server 102.

In a step S613, the bibliography information management unit 339 of the bibliography server 102 generates a job list based on the user information included in the job obtaining request transmitted from the multifunction peripheral 1000 in the step S612.

In a step S614, the communication control unit 333 of the bibliography server 102 transmits the job list generated in the step S613 to the multifunction peripheral 1000.

Figure 16:
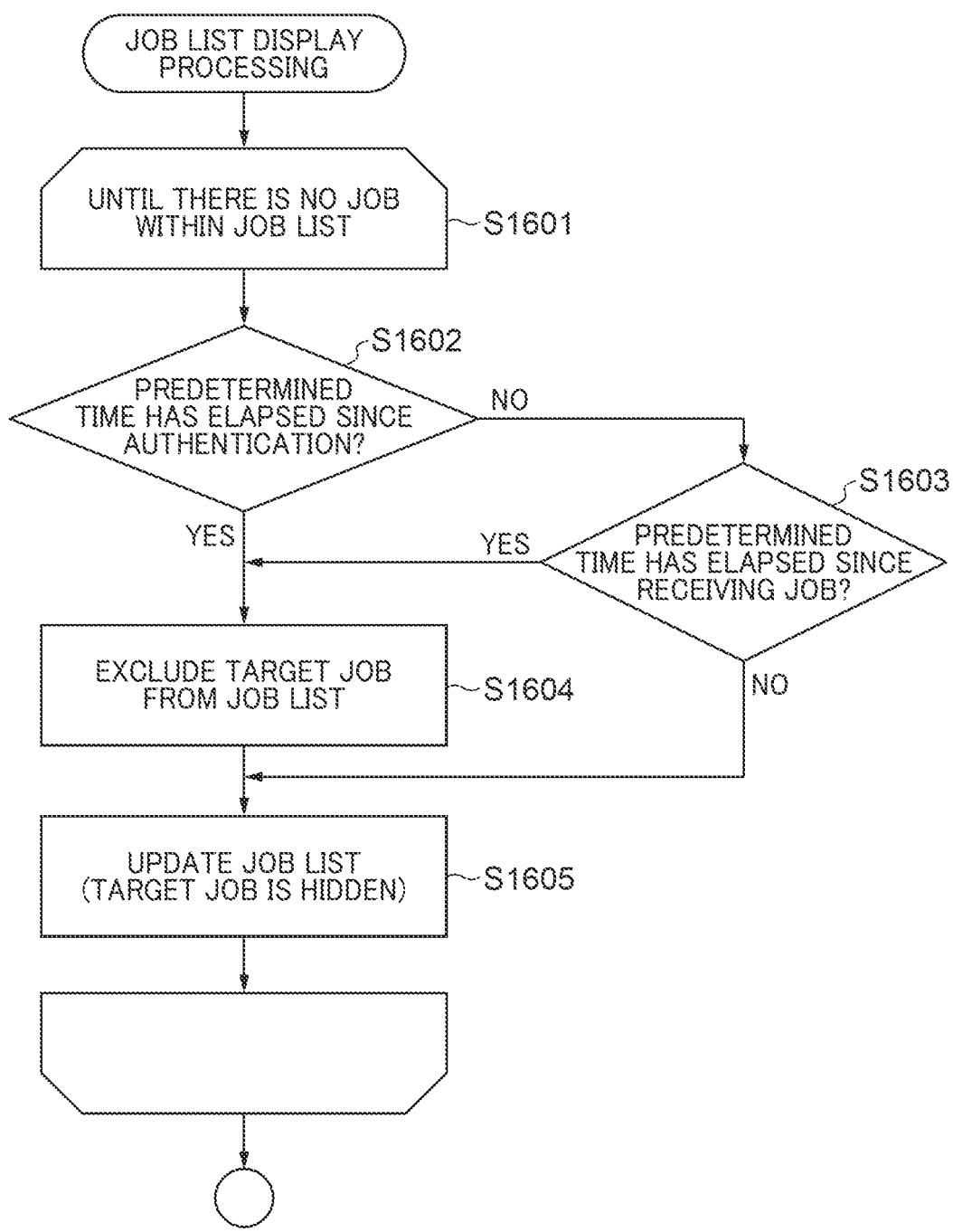
FIG. 16 is a flowchart of a job list display processing in a step S615 of FIG. 6.

In a step S615, the hold print control unit 313 (an obtaining unit) executes a job list display processing that instructs the panel control unit 208 to display the job list, which is obtained from the bibliography server 102 in the step S614, on the operation panel 210. That is, in the case that the user who generated the job spooled in the step S606 is authenticated in the step S611, the hold print control unit 313 (a print permitting unit) displays the job list on the operation panel 210 so as to permit printing of that job by that user. Further, the details of the job list display processing will be described with reference to a flowchart of FIG. 16. Moreover, the job list display processing is achieved by the CPU 201 expanding the program stored in the ROM 202 or the HDD 204 to the RAM 203 and executing the expanded program.

In a step S1601, subsequent steps S1602 to S1605 are repeated until there is no job displayed on the operation panel 210 among the jobs in the job list. The job displayed on the operation panel 210 means a job that is not hidden (that is not excluded from the job list) in the job list display processing among the jobs in the job list. Moreover, although not shown in the flowchart of FIG. 16, when there is a print request or a cancellation (deletion) request from the user with respect to the job displayed on the operation panel 210 during the execution of the job list display processing, that job is excluded from the job list and is also hidden from the operation panel 210. Further, although not shown in FIG. 6, even during and after the processes of steps S616 to S619 that will be described later, the job list display processing is continuously executed until there is no job displayed on the operation panel 210 among the jobs in the job list.

In the step S1602, the hold print control unit 313 compares an elapsed time after user authentication from accepting the user authentication in the step S611 to the current time, with the first limited time set in the limited time setting region 1402. In the case that the elapsed time after user authentication exceeds the first limited time set in the limited time setting region 1402 (YES in the step S1602), the job list display processing proceeds to a step S1604, and on the other hand, in the case that the elapsed time after user authentication does not exceed the first limited time set in the limited time setting region 1402 (NO in the step S1602), the job list display processing proceeds to a step S1603.

In the step S1603, the hold print control unit 313 compares an elapsed time after job reception from a job reception time described in the bibliography information of the job to the current time, with the second limited time set in the limited time setting region 1402. In the case that the elapsed time after job reception exceeds the second limited time (YES in the step S1603), the job list display processing proceeds to the step S1604, and on the other hand, in the case that the elapsed time after job reception does not exceed the second limited time (NO in the step S1603), the job list display processing proceeds to the step S1605.

In the step S1604, the hold print control unit 313 excludes the jobs, which are judged to have exceeded the first limited time or the second limited time (YES in the step S1602 or YES in the step S1603), from the job list. That is, in the case that the first limited time has elapsed from the user authentication in the step S611, the hold print control unit 313 hides the job list and does not permit printing of the job spooled in the step S606. Further, in the case that the second limited time has elapsed from the time when the job spooled in the step S606 is received from the user's PC, the hold print control unit 313 excludes the spooled job from the job list and does not permit printing of the spooled job.

In the step S1605, the hold print control unit 313 updates the job list displayed on the operation panel 210. As a result, the jobs excluded from the job list in the step S1604 are hidden in the operation panel 210.

Returning to FIG. 6, in the step S616, when there is a user operation that selects a job from the job list displayed on the operation panel 210 and issues a print instruction of the job, the panel control unit 228 detects the user operation as a print request of the job.

In a step S617, the hold print control unit 313 obtains the location where the job is stored from the bibliography information of the job being the target of the print request detected in the step S616, and requests the data obtaining unit 309 to obtain the job from the storage apparatus 101. In response to this request, the data obtaining unit 309 transmits the job obtaining request to the storage apparatus 101.

In a step S618, the hold print control unit 329 of the storage apparatus 101 transmits the job being the target of the job obtaining request, which is transmitted from the multifunction peripheral 1000 in the step S617, to the multifunction peripheral 1000.

In a step S619, the hold print control unit 313 judges that the job transmitted from the storage apparatus 101 in the step S618 is a print job, and passes the print job to the printing and reading processing unit 305. As a result, the print job is executed. Specifically, the printing and reading processing unit 305 forms an image based on the print job, and the device control unit 306 controls the printer 212 via the printer I/F control unit 207 and prints out the formed image.

As described above, in the case that the ZT mode is turned on, in the conventional system, a print job generated by an application that is not permitted by the system administrator is error-terminated. On the other hand, in the system of the first embodiment of the present invention, such a print job is converted into a job with authentication, and printing of the job with authentication is permitted when the user who generated this print job is authenticated. As a result, it becomes possible to improve the convenience of the user.

Further, by adding a certain time constraint (setting of the first limited time and the second limited time) in addition to the user authentication, it becomes possible to provide a more secure system for the system administrator of the multifunction peripheral 1000.

Furthermore, the storage apparatus 101 may be an external apparatus having a hold print function, and for example, instead of the storage apparatus 101, a multifunction peripheral having a scanner function and a printer function equivalent to that of the multifunction peripheral 1000 may be used. Moreover, the case that the multifunction peripheral 1000 also has the functions of the storage apparatus 101 will be described in a second embodiment of the present invention.

Next, the second embodiment of the present invention will be described. In the first embodiment of the present invention, the example has been described in which the storage destination of the job received by the multifunction peripheral 1000 is set in the external storage apparatus 101 instead of the inside of the multifunction peripheral 1000, and the job is printed as the job with authentication. On the other hand, in the second embodiment of the present invention, an example will be described in which the storage destination of the job received by the multifunction peripheral 1000 is provided in the main body of the multifunction peripheral 1000, and the job is printed as the job with authentication. Moreover, since the configuration of the system, the hardware configuration of the system, and the software configuration of the system that have been described with reference to FIGS. 1 to 3C are the same as those described in the first embodiment of the present invention, the description thereof will be omitted.

Figure 17:
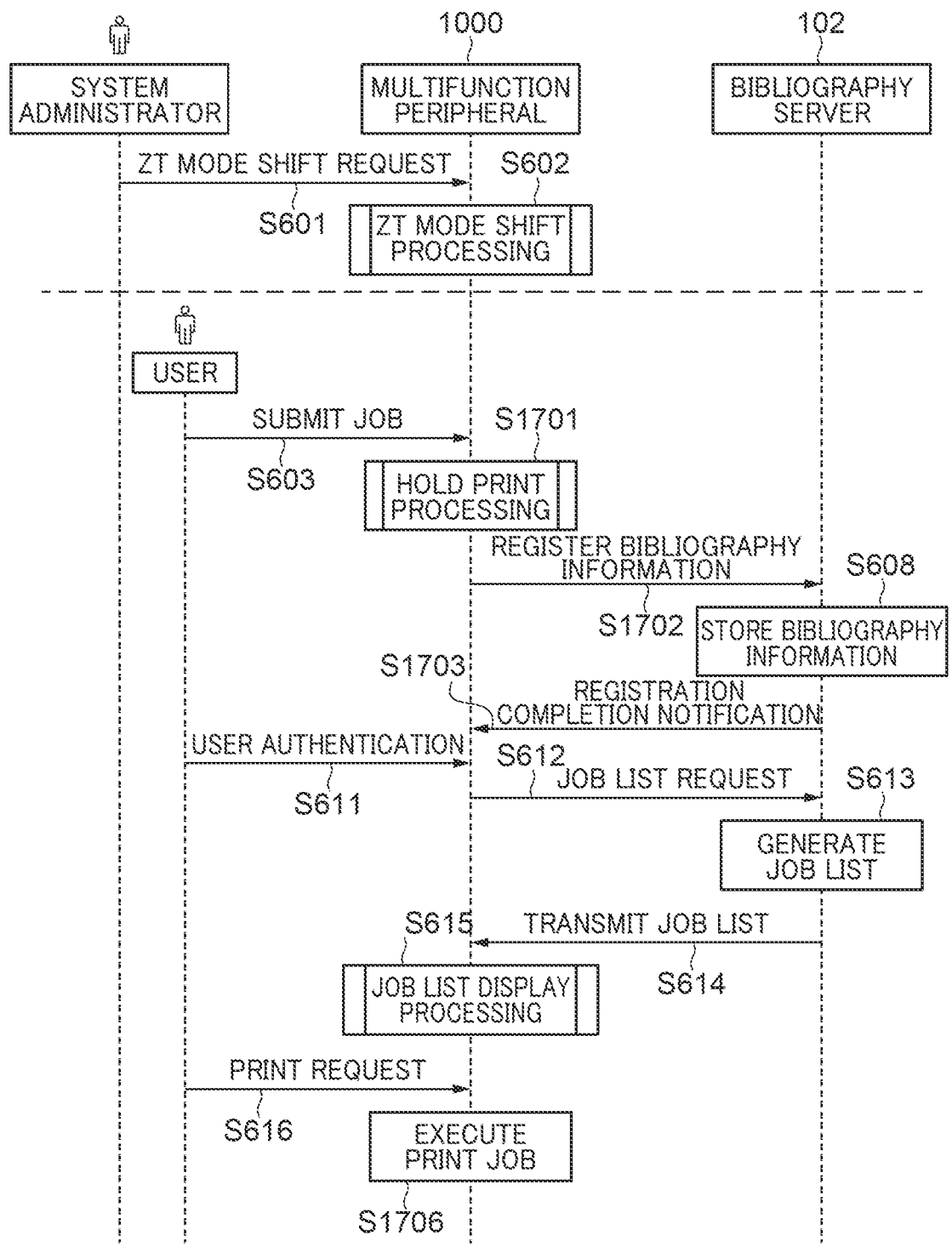
FIG. 17 is a sequence of processes executed in the multifunction peripheral, the storage apparatus, and the bibliography server in the case that the user submits a job into the multifunction peripheral when the ZT mode is turned on in a system of a second embodiment of the present invention.

FIG. 17 is a sequence of processes executed in the multifunction peripheral 1000, the storage apparatus 101, and the bibliography server 102 in the case that the user submits a job into the multifunction peripheral 1000 when the ZT mode is turned on in a system of the second embodiment of the present invention. Moreover, these processes are achieved by the CPU 201 executing the programs expanded to the RAM 203. Further, since the steps S601 to S616 shown in FIG. 17 have already been described with reference to FIG. 6, the details will be omitted.

In a step S1701, the hold print control unit 313 executes a hold print processing that holds the job, which is submitted into the multifunction peripheral 1000 by the user from the PC in the step S603, in the multifunction peripheral 1000. The details of the hold print processing will be described with reference to a flowchart of FIG. 18. Moreover, the hold print processing is achieved by the CPU 201 executing the programs expanded to the RAM 203. Further, since the steps S1201 to S1205, and S1501 of FIG. 18 have already been described with reference to FIG. 12 and FIG. 15, the details will be omitted.

Figure 18:
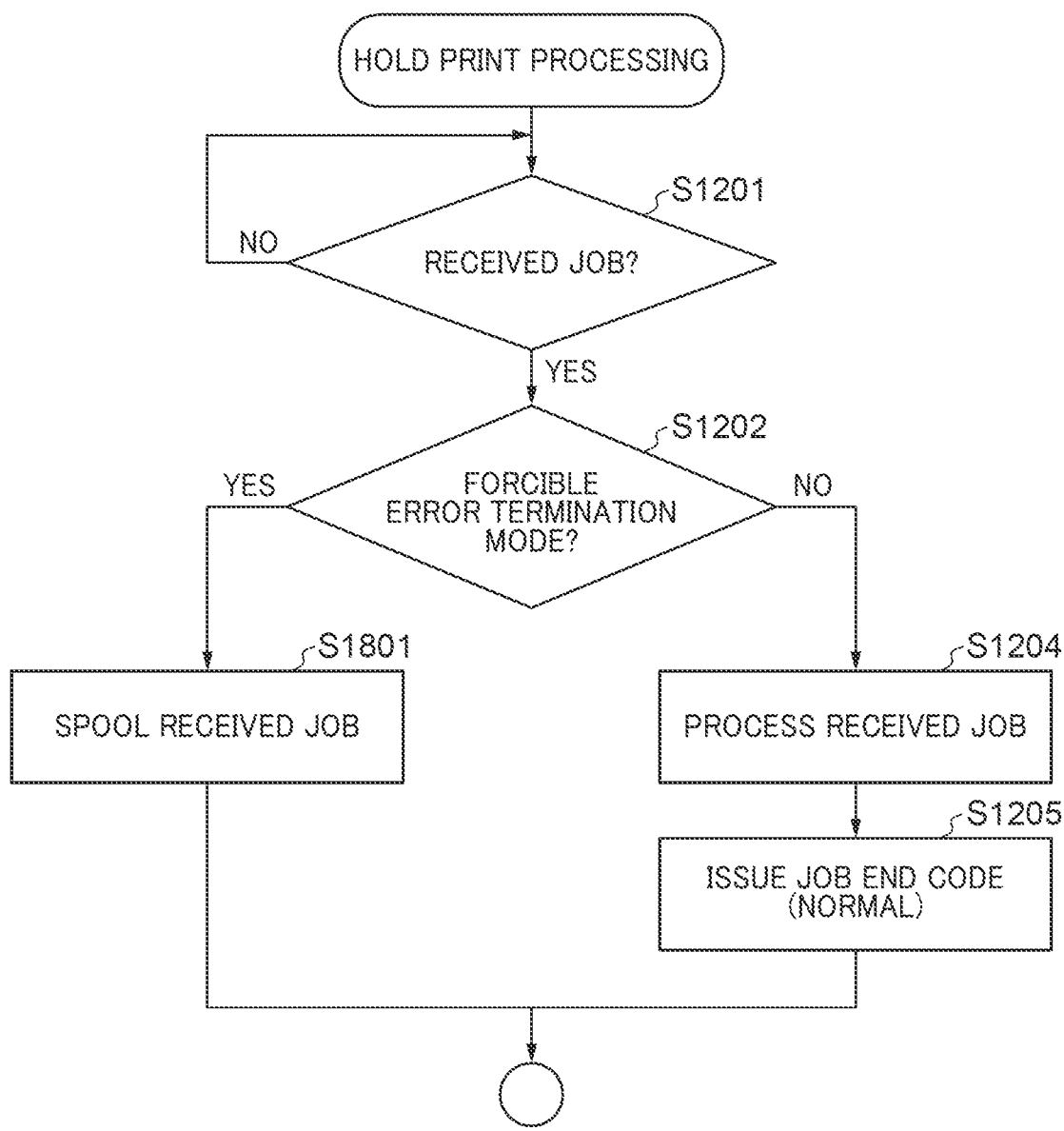
FIG. 18 is a flowchart of a hold print processing in a step S1701 of FIG. 17.

As shown in FIG. 18, in the case that the control unit of the job submission destination port is in the forcible error termination mode (YES in the step S1202), the hold print processing proceeds to a step S1801, and the hold print control unit 313 stores the received job in the storage region within the multifunction peripheral 1000 such as the HDD 204. After that, the hold print processing ends.

Moreover, during the hold print processing in the step S1701, the hold print control unit 313 obtains bibliography information of the spooled job. Here, the bibliography information includes the job name, the reception time and date, the owner information set in the job, the user information such as the domain name and the computer name, and the print setting information such as the number of printing copies and the page orientation.

Moreover, the processes of a step S1702 of FIG. 17 and subsequent steps may be executed in the case that a hold print setting in the multifunction peripheral 1000 is turned on. In this case, when the hold print setting is turned off, after the hold print processing in the step S1701 is executed, the processes of the step S605 of FIG. 6 and subsequent steps are executed. Here, the hold print setting is a setting that allows the user to switch ON/OFF at any time on the operation panel 210 (a switching unit), and with respect to the job submitted after the user has switched the hold print setting to ON, the processes of the step S1702 and subsequent steps are executed.

In the step S1702, the CPU 201 transmits the bibliography information obtained in the step S1701 to the bibliography server 102 for registration.

In the step S608, the bibliography information management unit 339 of the bibliography server 102 stores the bibliography information received from the multifunction peripheral 1000 in the internal storage such as the HDD 234.

In a step S1703, after the received bibliography information has been stored, the communication control unit 333 of the bibliography server 102 notifies the multifunction peripheral 1000 that storing of the bibliography information is completed.

After that, in the step S616, when there is a user operation that selects a job from the job list displayed on the operation panel 210 and issues a print instruction of the job, the panel control unit 228 detects the user operation as a print request of the job. In a step S1706, the hold print control unit 313 obtains the location where the job is stored from the bibliography information of the job being the target of the print request detected in the step S616, and requests the data obtaining unit 309 to obtain the job stored in the HDD 204. The hold print control unit 313 judges that the job obtained by the data obtaining unit 309 in response to this request is a print job, and passes the print job to the printing and reading processing unit 305. As a result, the print job is executed. Specifically, the printing and reading processing unit 305 forms an image based on the print job, and the device control unit 306 controls the printer 212 via the printer OF control unit 207 and prints out the formed image.

As described above, in the case that the ZT mode is turned on, in the conventional system, a print job generated by an application that is not permitted by the system administrator is error-terminated. On the other hand, in the system of the second embodiment of the present invention, such a print job is converted into a job with authentication while being stored (spooled) the inside of the multifunction peripheral 1000, and when the user is authenticated, printing by the multifunction peripheral 1000 becomes possible. As a result, even in the case that there is no storage apparatus 101 the outside of the multifunction peripheral 1000, same as the first embodiment of the present invention, it becomes possible to improve the convenience of the user while ensuring the security of the multifunction peripheral 1000 by authentication.

Although the preferred embodiments of the present invention have been described above, the present invention is not limited to these embodiments, and various modifications and modifications can be made within the scope of the gist thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105933, filed Jun. 25, 2021, which is hereby incorporated by reference herein in its entirety.

What is claimed is:

1. An image forming apparatus that transmits and receives data to and from a plurality of external apparatuses via a plurality of network ports, comprising:
   a setting unit configured to set an application permitted to be used in a mode, which blocks the network ports other than a prescribed network port in response to a request from the outside;
   a job storing unit configured such that in a case that a job received from the external apparatus via one of the plurality of network ports is not a job of the application permitted to be used which is set by the setting unit, the received job is stored;
   an authentication unit configured to perform user authentication; and
   a print permitting unit configured such that in a case that the user authentication is performed by the authentication unit with respect to a user who generated the stored job, printing of the stored job by the authenticated user is permitted.

2. The image forming apparatus according to claim 1, wherein a storage destination, in which the job storing unit stores the received job, is an external apparatus connected to the image forming apparatus via a network.

3. The image forming apparatus according to claim 1, wherein a storage destination, in which the job storing unit stores the received job, is a storage region within a main body of the image forming apparatus.

4. The image forming apparatus according to claim 1, further comprising:
   a switching unit configured to switch a storage destination, in which the job storing unit stores the received job to one of an external apparatus connected to the image forming apparatus via a network and a storage region within a main body of the image forming apparatus.

5. The image forming apparatus according to claim 1, wherein, in a case that a first limited time has elapsed from the user authentication performed by the authentication unit, the print permitting unit does not permit printing of the job for which the printing has been permitted.

6. The image forming apparatus according to claim 1, wherein, in a case that a second limited time has elapsed since receiving the job for which the printing has been permitted, the print permitting unit does not permit printing of the job for which the printing has been permitted.

7. The image forming apparatus according to claim 1, further comprising:
   an obtaining unit configured to obtain a job list of jobs generated by the user authenticated by the authentication unit from a bibliography server that obtains and stores bibliography information of the stored job.

8. A control method for an image forming apparatus that transmits and receives data to and from a plurality of external apparatuses via a plurality of network ports, the control method comprising:
   a setting step of setting an application permitted to be used in a mode, which blocks the network ports other than a prescribed network port in response to a request from the outside;
   a job storing step that in a case that a job received from the external apparatus via one of the plurality of network ports is not a job of the application permitted to be used which is set by the setting step, the received job is stored;
   an authentication step of performing user authentication; and
   a print permitting step that in a case that the user authentication is performed by the authentication step with respect to a user who generated the stored job, printing of the stored job by the authenticated user is permitted.

9. A non-transitory computer-readable storage medium storing a program for causing a computer to execute a control method for an image forming apparatus that transmits and receives data to and from a plurality of external apparatuses via a plurality of network ports, the control method comprising:
   a setting step of setting an application permitted to be used in a mode, which blocks the network ports other than a prescribed network port in response to a request from the outside;
   a job storing step that in a case that a job received from the external apparatus via one of the plurality of network ports is not a job of the application permitted to be used which is set by the setting step, the received job is stored;
   an authentication step of performing user authentication; and
   a print permitting step that in a case that the user authentication is performed by the authentication step with respect to a user who generated the stored job, printing of the stored job by the authenticated user is permitted.

* * * * *